United States Patent
Islam et al.

(10) Patent No.: US 11,191,097 B2
(45) Date of Patent: Nov. 30, 2021

(54) RECEPTION OF MULTIPLE UPLINK CONTROL MESSAGES AT A SAME TIME SLOT

(71) Applicant: QUALCOMM Incorporated, San Diego, CA (US)

(72) Inventors: Muhammad Nazmul Islam, Edison, NJ (US); Juergen Cezanne, Ocean Township, NJ (US); Sundar Subramanian, Bridgewater, NJ (US); Jung Ho Ryu, Jersey City, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 14/964,101

(22) Filed: Dec. 9, 2015

(65) Prior Publication Data

US 2017/0055281 A1    Feb. 23, 2017

Related U.S. Application Data

(60) Provisional application No. 62/205,982, filed on Aug. 17, 2015.

(51) Int. Cl.
*H04W 72/12* (2009.01)
*H04B 7/06* (2006.01)
(Continued)

(52) U.S. Cl.
CPC ....... *H04W 72/1284* (2013.01); *H04L 5/0016* (2013.01); *H04L 5/0053* (2013.01);
(Continued)

(58) Field of Classification Search
USPC ......................................................... 370/336
See application file for complete search history.

(56) References Cited

U.S. PATENT DOCUMENTS

| 6,542,485 B1 * | 4/2003 | Mujtaba ................. H04B 7/26 370/335 |
| 8,289,931 B2 | 10/2012 | Higuchi et al. |

(Continued)

FOREIGN PATENT DOCUMENTS

| CN | 1437420 A | 8/2003 |
| CN | 101485107 A | 7/2009 |

(Continued)

OTHER PUBLICATIONS

ISA/EP, International Search Report and Written Opinion of the International Searching Authority, Int'l Application No. PCT/US2016/042797, dated Oct. 5, 2016, European Patent Office, Rijswijk, NL, 11 pgs.

*Primary Examiner* — Gregory B Sefcheck
*Assistant Examiner* — Majid Esmaeilian
(74) *Attorney, Agent, or Firm* — Kevin M. Donnelly

(57) ABSTRACT

A base station may transmit scheduling information comprising one or more first downlink messages to a first user equipment (UE) in a first beam. The base station may transmit one or more second downlink messages to a second UE in a second beam. In response to the transmission of the one or more first downlink messages, the base station may receive one or more first uplink control messages from the first UE in a time slot. In response to the transmission of the one or more second downlink messages, the base station may receive one or more second uplink control messages from the second UE in the same time slot. The one or more second uplink control messages may be frequency-orthogonal or spreading code-orthogonal to the one or more first uplink control messages.

28 Claims, 18 Drawing Sheets

(51) Int. Cl.
*H04L 5/00* (2006.01)
*H04W 72/04* (2009.01)

(52) U.S. Cl.
CPC ..... *H04W 72/0446* (2013.01); *H04W 72/121* (2013.01); *H04W 72/1231* (2013.01); *H04W 72/1289* (2013.01); *H04B 7/0617* (2013.01)

(56) References Cited

U.S. PATENT DOCUMENTS

| | | | |
|---|---|---|---|
| 8,428,042 B1 | 4/2013 | Chion et al. | |
| 8,902,773 B2 | 12/2014 | Anderson et al. | |
| 9,019,930 B2 | 4/2015 | Proctor, Jr. | |
| 2003/0181163 A1* | 9/2003 | Ofuji | H01Q 1/1257 455/25 |
| 2003/0193925 A1* | 10/2003 | Mujtaba | H04L 5/143 370/347 |
| 2007/0115800 A1* | 5/2007 | Fonseka | H04L 1/0054 370/208 |
| 2008/0316959 A1* | 12/2008 | Bachl | H04L 1/1671 370/329 |
| 2011/0205988 A1 | 8/2011 | Zhang et al. | |
| 2012/0127932 A1* | 5/2012 | Gao | H04L 5/0053 370/329 |
| 2012/0289338 A1* | 11/2012 | Chen | A63F 13/235 463/39 |
| 2013/0022019 A1 | 1/2013 | Han et al. | |
| 2013/0114501 A1* | 5/2013 | Kishiyama | H04J 13/004 370/328 |
| 2013/0176924 A1* | 7/2013 | Kishiyama | H04L 1/1614 370/311 |
| 2013/0322280 A1* | 12/2013 | Pi | H04W 72/0413 370/252 |
| 2014/0003369 A1 | 1/2014 | Josiam et al. | |
| 2014/0024386 A1* | 1/2014 | Novak | H04W 72/082 455/452.1 |
| 2014/0036796 A1* | 2/2014 | Etemad | H04W 48/14 370/329 |
| 2014/0146768 A1* | 5/2014 | Seo | H04W 72/0453 370/329 |
| 2014/0161050 A1* | 6/2014 | Grinshpun | H04L 65/4069 370/329 |
| 2014/0204866 A1* | 7/2014 | Siomina | H04L 25/03821 370/329 |
| 2014/0348255 A1* | 11/2014 | Lorca Hernando | H01Q 21/061 375/267 |
| 2015/0079945 A1* | 3/2015 | Rubin | H04L 67/2842 455/411 |
| 2015/0103800 A1* | 4/2015 | Seo | H04W 48/16 370/330 |
| 2015/0189574 A1* | 7/2015 | Ng | H04W 24/08 370/252 |
| 2015/0245339 A1 | 8/2015 | Verma et al. | |
| 2016/0353440 A1* | 12/2016 | Lee | H04W 72/0453 |
| 2017/0033916 A1* | 2/2017 | Stirling-Gallacher | H04L 5/1438 |
| 2017/0134083 A1* | 5/2017 | Kim | H04B 7/0456 |

FOREIGN PATENT DOCUMENTS

| | | |
|---|---|---|
| EP | 2056505 A1 | 5/2009 |
| JP | 2003235072 A | 8/2003 |
| JP | 2006217415 A | 8/2006 |
| JP | 2009500899 A | 1/2009 |
| JP | 2013528978 A | 7/2013 |
| JP | 2013240069 A | 11/2013 |
| WO | WO-2007004924 A1 | 1/2007 |
| WO | WO-2008004609 A1 | 1/2008 |
| WO | WO-2010018977 A2 | 2/2010 |
| WO | WO-2014181378 A1 | 11/2014 |

\* cited by examiner

RECEPTION OF MULTIPLE UPLINK CONTROL MESSAGES AT A SAME TIME SLOT

CROSS REFERENCES

The present application for Patent claims priority to U.S. Provisional Patent Application No. 62/205,982 by Islam et al., entitled "Reception of Multiple Uplink Control Messages at a Same Time Slot," filed Aug. 17, 2015, assigned to the assignee hereof.

BACKGROUND

The following relates generally to wireless communication, and more specifically to reception of multiple uplink control messages at a same time slot.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE). Communications from a base station to a UE may be referred to as downlink communications and communications from a UE to a base station may be referred to as uplink communications.

In some cases, a base station may send downlink messages to multiple UEs. In response to the downlink messages, the UEs may send uplink control messages to the base station. The UEs may transmit their respective uplink control messages to the base station at different times. In such a scenario, a UE may wait for other UEs to transmit before sending its uplink control messages, resulting in latency. In some cases, the response uplink control messages may be conveyed using a small number of bits. In such cases, the radio resources used to carry uplink control messages from a single UE may be capable of carrying larger amounts of data, resulting in an inefficient use of radio resources.

SUMMARY

A base station may transmit downlink messages to multiple user equipments (UEs) using a different beam for each UE. In response to the downlink messages, the UEs may use the same time resources to transmit uplink control messages. The frequency resources selected by the UEs for the uplink transmission may be orthogonal in the frequency domain. In some cases, the base station may select the multiple UEs for simultaneous uplink transmission based on the positioning of each UE. In this or other cases, the signal-to-noise-ratio (SNR) of channels associated with each UE may factor into the selection of the UEs. In some cases, the UEs may be selected based on the number of downlink messages transmitted to each UE. The simultaneous uplink transmissions may occur according to scheduling information from the base station or autonomously. In some cases, the base station may use analog beamforming to receive the simultaneous uplink transmissions.

A method of wireless communication is described. The method may include transmitting scheduling information via one or more first downlink messages to a first UE in a first beam, transmitting scheduling information via one or more second downlink messages to a second UE in a second beam, receiving, in response to the transmission of the one or more first downlink messages, one or more first uplink control messages from the first UE in a time slot, and receiving, in response to the transmission of the one or more second downlink messages, one or more second uplink control messages from the second UE in the time slot, the one or more second uplink control messages being frequency-orthogonal or spreading code-orthogonal to the one or more first uplink control messages.

An apparatus for wireless communication is described. The apparatus may include means for transmitting scheduling information via one or more first downlink messages to a first UE in a first beam, means for transmitting scheduling information via one or more second downlink messages to a second UE in a second beam, means for receiving, in response to the transmission of the one or more first downlink messages, one or more first uplink control messages from the first UE in a time slot, and means for receiving, in response to the transmission of the one or more second downlink messages, one or more second uplink control messages from the second UE in the time slot, the one or more second uplink control messages being frequency-orthogonal or spreading code-orthogonal to the one or more first uplink control messages.

A further apparatus for wireless communication is described. The apparatus may include a processor, memory in electronic communication with the processor, and instructions stored in the memory and operable, when executed by the processor, to cause the apparatus to transmit scheduling information via one or more first downlink messages to a first UE in a first beam, transmit scheduling information via one or more second downlink messages to a second UE in a second beam, receive, in response to the transmission of the one or more first downlink messages, one or more first uplink control messages from the first UE in a time slot, and receive, in response to the transmission of the one or more second downlink messages, one or more second uplink control messages from the second UE in the time slot, the one or more second uplink control messages being frequency-orthogonal or spreading code-orthogonal to the one or more first uplink control messages.

A non-transitory computer-readable medium storing code for wireless communication is described. The code may include instructions executable to transmit scheduling information via one or more first downlink messages to a first UE in a first beam, transmit scheduling information via one or more second downlink messages to a second UE in a second beam, receive, in response to the transmission of the one or more first downlink messages, one or more first uplink control messages from the first UE in a time slot, and receive, in response to the transmission of the one or more second downlink messages, one or more second uplink control messages from the second UE in the time slot, the one or more second uplink control messages being frequency-orthogonal or spreading code-orthogonal to the one or more first uplink control messages.

Some examples of the method, apparatuses, or non-transitory computer-readable medium described herein may further include processes, features, means, or instructions for selecting the first UE and the second UE from a group of UEs for transmission of frequency-orthogonal or spreading code-orthogonal messages in a same time slot. Additionally or alternatively, in some examples selecting the first UE and the second UE may be based at least in part on respective angles of arrival of signals received from the first UE and the second UE.

In some examples of the method, apparatuses, or non-transitory computer-readable medium described herein, selecting the first UE and the second UE comprises selecting the first UE and the second UE based at least in part on respective SNRs associated with channels used by the first UE and the second UE to communicate uplink control traffic. Additionally or alternatively, in some examples selecting the first UE and the second UE comprises selecting the first UE and the second UE based at least in part on a number of downlink resource blocks transmitted to the first UE and the second UE, respectively.

In some examples of the method, apparatuses, or non-transitory computer-readable medium described herein, the scheduling information may indicate the time slot and a tone index that the first UE and the second UE are to use for transmitting the one or more first uplink control messages and the one or more second uplink control messages. Additionally or alternatively, some examples may include processes, features, means, or instructions for transmitting the one or more first downlink messages and the one or more second downlink messages at a same time.

In some examples of the method, apparatuses, or non-transitory computer-readable medium described herein, the one or more first downlink messages and the one or more second downlink messages comprise data, and wherein the one or more first uplink control messages and the one or more second uplink control messages comprise an acknowledgment or negative acknowledgment associated with the one or more first downlink messages or the one or more second downlink messages. Additionally or alternatively, in some examples the one or more first downlink messages and the one or more second downlink messages comprise control information, and wherein the one or more first uplink control messages and the one or more second uplink control messages comprise an acknowledgment, a negative acknowledgment, or a channel quality indicator (CQI) associated with the one or more first downlink messages or the one or more second downlink messages.

Some examples of the method, apparatuses, or non-transitory computer-readable medium described herein may further include processes, features, means, or instructions for receiving the one or more first uplink control messages and the one or more second uplink control messages by using beamforming based at least in part on a geographic location associated with the first UE and the second UE. Additionally or alternatively, some examples may include processes, features, means, or instructions for receiving the one or more first uplink control messages and the one or more second uplink control messages by using analog beamforming.

Some examples of the method, apparatuses, or non-transitory computer-readable medium described herein may further include processes, features, means, or instructions for using one or more millimeter waveforms to receive the one or more first uplink control messages and the one or more second uplink control messages. Additionally or alternatively, some examples may include processes, features, means, or instructions for using one or more millimeter waveforms to transmit the one or more first downlink messages and the one or more second downlink messages.

A method of wireless communication is described. The method may include receiving, from a base station, scheduling information via one or more downlink messages at a first UE in a first beam, and transmitting, in response to the reception of the one or more downlink messages, one or more first uplink control messages to a base station in a time slot, wherein the one or more first uplink control messages are frequency-orthogonal or spreading code-orthogonal to one or more second uplink control messages transmitted from a second UE to the base station in the time slot.

An apparatus for wireless communication is described. The apparatus may include means for receiving, from a base station, scheduling information via one or more downlink messages at a first UE in a first beam, and means for transmitting, in response to the reception of the one or more downlink messages, one or more first uplink control messages to a base station in a time slot, wherein the one or more first uplink control messages are frequency-orthogonal or spreading code-orthogonal to one or more second uplink control messages transmitted from a second UE to the base station in the time slot.

A further apparatus for wireless communication is described. The apparatus may include a processor, memory in electronic communication with the processor, and instructions stored in the memory and operable, when executed by the processor, to cause the apparatus to receive, from a base station, scheduling information via one or more downlink messages at a first UE in a first beam, and transmit, in response to the reception of the one or more downlink messages, one or more first uplink control messages to a base station in a time slot, wherein the one or more first uplink control messages are frequency-orthogonal or spreading code-orthogonal to one or more second uplink control messages transmitted from a second UE to the base station in the time slot.

A non-transitory computer-readable medium storing code for wireless communication is described. The code may include instructions executable to receive, from a base station, scheduling information via one or more downlink messages at a first UE in a first beam, and transmit, in response to the reception of the one or more downlink messages, one or more first uplink control messages to a base station in a time slot, wherein the one or more first uplink control messages are frequency-orthogonal or spreading code-orthogonal to one or more second uplink control messages transmitted from a second UE to the base station in the time slot.

In some examples of the method, apparatuses, or non-transitory computer-readable medium described herein, the first UE and the second UE are selected from a group of UEs for transmission of frequency-orthogonal or spreading code-orthogonal messages in a same time slot. Additionally or alternatively, in some examples the first UE and the second UE are selected based at least in part on respective angles of arrival of signals received from the first UE and the second UE. In some examples of the method, apparatuses, or non-transitory computer-readable medium described herein, the first UE and the second UE are selected based at least in part on respective SNRs associated with channels used by the first UE and the second UE to communicate uplink control traffic. Additionally or alternatively, in some examples the first UE and the second UE are selected based at least in part on a number of downlink resource blocks transmitted to the first UE and the second UE, respectively.

In some examples of the method, apparatuses, or non-transitory computer-readable medium described herein, the received scheduling information indicates that the first UE is to transmit the one or more first uplink control messages in the time slot using a tone index, wherein the scheduling information comprises an indicator that the second UE is to transmit the one or more second uplink control messages in the time slot. Additionally or alternatively, in some examples the one or more downlink messages comprise data, and the one or more first uplink control messages and the one or more second uplink control messages comprise an acknowledgment or negative acknowledgment associated with the one or more downlink messages received by the first UE or with one or more second downlink messages received by the second UE.

In some examples of the method, apparatuses, or non-transitory computer-readable medium described herein, the one or more downlink messages comprise control information, and wherein the one or more first uplink control messages and the one or more second uplink control messages comprise an acknowledgment, a negative acknowledgment, or a CQI associated with the one or more downlink messages received by the first UE or with the one or more second downlink messages received by the second UE. Additionally or alternatively, some examples may include processes, features, means, or instructions for using millimeter waveforms to transmit the one or more uplink control messages. Some examples of the method, apparatuses, or non-transitory computer-readable medium described herein may further include processes, features, means, or instructions for transmitting the one or more first uplink control messages by using analog beamforming.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

A base station may select multiple user equipments (UEs) for simultaneous uplink transmission. The UEs may be selected based on their positioning relative to the base station and on a signal-to-noise-ratio (SNR) of communication channels between the base station and the UEs. The base station may send scheduling information to the UEs that indicates the time and frequency resources to be used for the simultaneous uplink transmission. The frequency resources may be orthogonal in the frequency domain. The base station may use analog beamforming to receive the simultaneous uplink transmissions. In some cases, the analog beamforming is based on the geographic locations of the UEs. In some examples, the uplink transmission may include control information messages that are sent in response to downlink messages from the base station. For example, the control information messages may be acknowledgments (ACKs) or negative-acknowledgments (NACKs) that correspond to downlink messages received by the multiple UEs. In other cases, the control information messages may be channel quality indicator (CQI) reports that indicate the channel conditions for channels used by the UEs.

Aspects of the disclosure are initially described in the context of a wireless communication system. Specific examples are then described for reception of multiple uplink control messages at a same time slot in accordance with various aspects of the present disclosure. These and other aspects of the disclosure are further illustrated by and described with reference to apparatus diagrams, system diagrams, and flowcharts that relate to reception of multiple uplink control messages at a same time slot.

Figure 1:
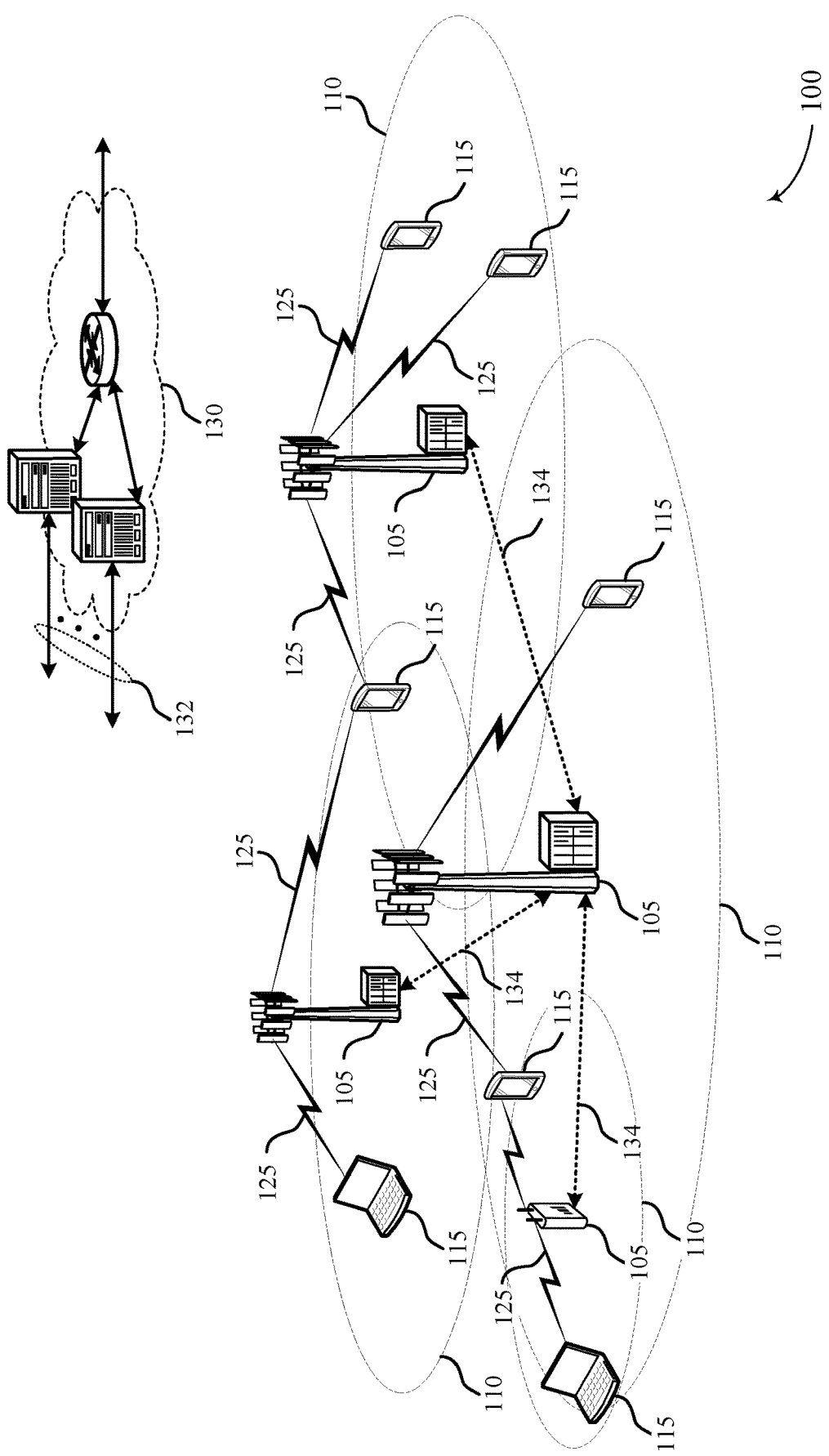
FIG. 1 illustrates an example of a wireless communications system that supports reception of multiple uplink control messages at a same time slot in accordance with various aspects of the present disclosure.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-advanced (LTE-a) network. In some cases, a base station 105 may select multiple UEs 115 to transmit to the base station 105 at the same time. The UEs 115 may use the same time slot but different frequencies (e.g., orthogonal frequencies) for the simultaneous uplink transmission. In some cases, the base station 105 may modify receive techniques (e.g., beamforming) to receive the simultaneous uplink transmissions.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A communication link 125 may include one or more carriers, where each carrier may be a signal made up of multiple subcarriers (e.g., waveform signals of different frequencies) modulated according to the various radio technologies described above. Each modulated signal may be sent on a different subcarrier and may carry control information (e.g., reference signals, control channels, etc.), overhead information, user data, etc. The communication links 125 may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2). The UEs 115 may blindly determine whether various symbols of the communication links are downlink or uplink resources. This may include a UE 115 receiving a pilot transmission from a base station 105 via communication link 125, and the UE 115 may rely on the pilot transmission to determine that a symbol is a downlink symbol.

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data. In some cases, a wireless device (e.g., a base station 105 or UE 115) may use directional beamforming in which radio signals are combined to create constructive and destructive interference that results in a particular radiation pattern. The radiation pattern created by beamforming (which may be referred to herein as a beam) may have areas (or lobes) of high field strength (e.g., gain) and areas of low field strength. The shape and orientation of a beam may be controlled so that one or more high-field strength lobes may be directed towards one or more target wireless devices. A wireless device may use digital beamforming or analog beamforming. In digital beamforming, the radiation pattern is generated by digitally shifting the phase and amplitude scaling for a signal; that is, phase shifting and amplitude scaling are done in the digital domain. In analog beamforming, phase shifting and amplitude scaling are performed in the analog domain.

Wireless communications system 100 may operate in an ultra-high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 or base station 105 (e.g., for directional beamforming).

When operating in the millimeter band, wireless communications system 100 may use millimeter waveforms to convey messages between wireless devices. Uplink and downlink messages may be sent during a period of time called a radio frame. A radio frame may be divided into smaller periods of time, referred to as subframes, that may be used to convey uplink control traffic or downlink traffic. Each subframe may be divided into smaller periods of time called symbols (e.g., each subframe may include 32 symbols). A subframe may also include a number of frequencies (referred to as "tones" or "subcarriers"). For example, a subframe may include 768 subcarriers. A wireless device may send uplink or downlink information in a resource block which is a number of subcarriers transmitted for a number of symbols (e.g., a resource block may be 384 subcarriers transmitting for 8 symbols). There may be eight resource blocks per subframe.

In some cases, wireless communications system 100 may implement a feedback scheme to ensure successful communication of traffic between wireless devices. For example, after a base station 105 transmits downlink traffic to a UE 115, the base station may wait until it receives an ACK from the UE 115 indicating that the traffic was correctly decoded. If the base station 105 does not receive an ACK, or if the base station 105 receives a NACK indicating that the traffic was not correctly decoded, the base station 105 may retransmit the uplink control traffic. In some cases, an ACK/NACK may be sent for each downlink resource block received at a UE 115. In addition to transmitting ACK/NACKs, a UE 115 may send other types of control information. For example, a UE 115 may send a CQI to a base station 105 that includes information about downlink channel conditions. In some cases, a base station 105 may determine the SNR of a channel associated with a UE 115. For example, a base station 105 may determine the SNR for an uplink channel used by a UE 115.

In some scenarios, multiple UEs 115 may use separate tones (or spreading sequences) to provide orthogonality between uplink messages (e.g., uplink control messages) that are sent in the same time slot; that is, the UEs 115 may design resource blocks to convey ACK/NACKs so they are detectable by a base station 105. For example, a UE 115 may divide a resource block into two tones (e.g., the resource block may include a tone pair). The tone pair may be contiguous in the frequency domain. The UE 115 may put energy into the first tone to indicate an ACK and may put energy into the second tone of the pair to indicate a NACK. Thus, multiple UEs may send multiple ACK/NACKs in the same subframe.

In some cases, a UE 115 may send multiple tone pairs for each ACK/NACK; that is, the UE 115 may use n number of tone pairs in a resource block duration to convey an ACK/NACK. In some examples, the spacing between the tone pairs may depend on the delay spread of the channel on which the tone pairs are sent. That is, the UE 115 may use more tone pairs when the delay spread is high to increase the likelihood that one of the tone pairs is successfully received at a base station 105. In some instances the location of the tone pairs are based on the UE identifier (ID) or cell ID. For instance, certain tone pairs may correspond to (or be reserved for) a particular UE. Thus, a base station 105 may know which UE an ACK/NACK corresponds to by evaluating the location of the ACK/NACK tone pair. In some examples, the location of the tone pairs may be based at least in part on the link budget of the system. The frequency with which the tone pairs are transmitted may depend on the latency requirements of the wireless communications system 100. For example, the frequency of the ACK/NACKs may increase when the latency requirements of wireless communications system 100 are strict and decrease when the latency requirements are flexible. Although described in terms of ACK/NACK transmissions, a UE 115 may insert other types of control information (e.g., scheduling grant requests and CQI reports) into the same uplink resource block, which may reduce uplink control overhead.

As described above, a UE 115 may indicate an ACK/NACK by placing energy in one tone of a tone pair used to convey the ACK/NACK. Each tone of a tone pair may be given an index (e.g., the first tone of the tone pair may be given a first index and the second tone of the tone pair may be given a second index). The energy of a tone may be denoted $x_{i,j}$, where i is the time slot (e.g., of a resource block) and j is the subcarrier index. For an ACK transmission, $x_{i,j}$ may be equal to 1 when j=1 and $x_{i,j}$ may be null when j=2. For a NACK transmission, $x_{i,j}$ may be null when j=1 and $x_{i,j}$ may be equal to 1 when j=2. In order to detect an ACK/NACK, a base station 105 may compare the energy in the first tone to the energy in the second tone. For example, the base station 105 may sum the power in the first tone index and compare it to the sum of the power in the second tone index. The power in a tone index may be denoted $y_{i,j}$, where i is the time slot index (e.g., of a resource block) and j is the subcarrier index. A base station 105 may detect an ACK by determining that sum of $y_{i1}^2$ is greater than or equal to the sum of $y_{i2}^2+\gamma^2$, where $\gamma$ is a scaling factor. A base station 105 may detect a NACK by determining that sum of $y_{i1}^2$ is less than or equal to the sum of $y_{i2}^2+\gamma^2$. The scaling factor $\gamma$ may be used to emphasize ACKs over NACKs (or vice versa) based on the importance of ACK detection. Thus, a base station 105 may determine that an ACK is indicated if the energy in the first tone is greater than the energy in the second tone. Conversely, the base station 105 may determine that a NACK is indicated if the energy in the first tone is less than the energy in the second tone.

In such a scenario, a base station 105 may distinguish between the messages from different UEs 115 by implementing an orthogonal frequency differentiation scheme. In one example, the UEs 115 may use orthogonal subcarriers to convey respective messages; that is a first UE 115 may use a first tone to convey an uplink message (e.g., an uplink control message) and a second UE 115 may use a second tone that is orthogonal to the first tone to convey an uplink message (e.g., and uplink control message). By way of example, a first UE may send an ACK (via a resource block tone-pair described above) using subcarriers that are orthogonal to the subcarriers used by a second UE to send a NACK. Two tones may be orthogonal if the cross-talk between the signals conveyed by the tones is eliminated. In some cases, a wireless device may use orthogonal subcarriers by selecting subcarriers with the appropriate subcarrier spacing. Alternatively, two wireless device may send spreading code-orthogonal signals by applying orthogonal spreading sequences to the respective signals.

Using the techniques described above, multiple UEs 115 in wireless communications system 100 may send frequency-orthogonal or spreading code-orthogonal messages to a base station 105 in the same time slot (e.g., a time slot that is common to the UEs, or shared by the UEs). Such a communication may be referred to herein as a simultaneous or concurrent uplink transmission, or a simultaneous or concurrent communication. In some cases the multiple UEs 115 may perform the simultaneous transmission using time and frequency resources indicated by the base station 105. In other cases, the simultaneous transmission may occur independent of scheduling information from the base station 105.

Figure 2:
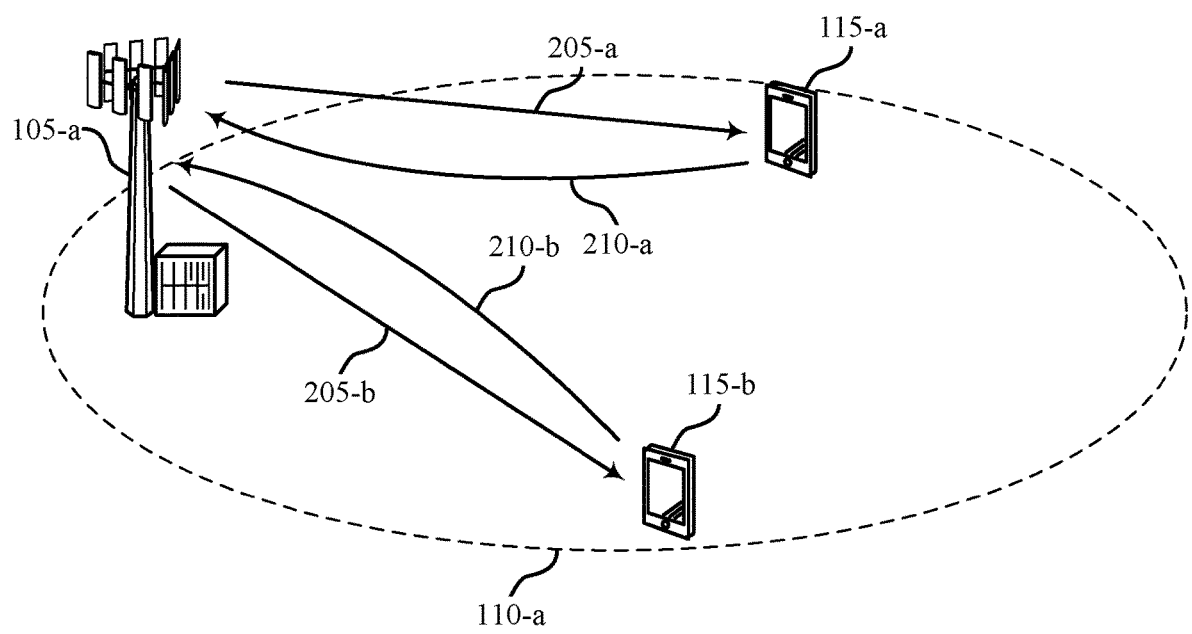
FIG. 2 illustrates an example of a wireless communications subsystem that supports reception of multiple uplink control messages at a same time slot in accordance with various aspects of the present disclosure.

FIG. 2 illustrates an example of a wireless communications subsystem 200 that supports reception of multiple uplink control messages at a same time slot in accordance with various aspects of the present disclosure. Although described with reference to control traffic, the techniques herein may be implemented for other types of traffic (e.g., user data traffic). In wireless communications subsystem 200, uplink and downlink traffic may be transmitted between base station 105-a and UEs 115 within coverage area 110-a. For example, base station 105-a may communicate with UE 115-a and UE 115-b. Base station 105-a and UE 115-a, 115-b may be examples of the base station 105 and UEs 115 of the wireless communications system 100 shown in FIG. 1.

Base station 105-a may send data and/or control information to UE 115-a via downlink 205-a. UE 115-a may send data and/or control information to base station 105-a via uplink 210-a. For example, UE 115-a may send ACK/NACKs to base station 105-a in response to downlink data. In other examples, UE 115-a may send a CQI to base station 105-a. The CQI may indicate the channel quality for downlink 205-a. Base station 105-a may also send data and/or control information to UE 115-b via downlink 205-b, and receive uplink control traffic from UE 115-b via uplink 210-b. In some cases, base station 105-a may transmit to UE 115-a and UE 115-b simultaneously. In other cases, base station 105-a may transmit to UE 115-a and UE 115-b at two different times (e.g., base station 105-a may transmit downlink traffic to UE 115-a in a first time slot and transmit downlink traffic to UE 115-b in a second time slot). In either scenario, the downlink traffic may be sent using the same or different beams.

UEs 115 may transmit uplink control traffic at the same time. For example, UE 115-a and UE 115-b may each transmit uplink control traffic to base station 105-a in the same time slot. A time slot that is concurrently used by multiple UEs 115 may be referred to as a shared time slot or a common time slot. Base station 105-a may coordinate the simultaneous uplink control transmissions of UE 115-a and UE 115-b by sending scheduling information to each of the UEs 115. Alternatively, the simultaneous uplink control transmissions may occur independent of explicit coordination by base station 105-a. For example, ACK/NACKs for downlink signals may be sent N time slots (e.g., subframes) after the corresponding downlink signals have been received. Thus, downlink signals that are received at the same time by UE 115-a and UE 115-b may be ACK/NACKed simultaneously. When uplink control traffic from multiple UEs 115 is present in a single time slot, each UE 115 may render its uplink control traffic frequency-orthogonal to that of the other UEs (e.g., by implementing the tone pair scheme above, or applying unique orthogonal spreading sequence to its uplink signals). For example, a UE 115 may place uplink messages (e.g., uplink control messages) in orthogonal tones based on the tone index that is assigned to the UE 115. The tone index may indicate which tones the UE 115 may use to convey its uplink control traffic. A base station 105 may use the frequency-domain orthogonality of uplink messages to distinguish between the uplink messages from different UEs. In some cases, the uplink frequency resources for a UE 115 may be assigned to the UE 115 by a base station 105-a (e.g., the base station 105-a may send a tone index to the UE). Alternatively, the uplink frequency resources may be predetermined (e.g., the uplink frequencies may be a function of the UE 115 identifier (ID)).

In some cases, base station 105-a may coordinate simultaneous uplink transmissions from multiple UEs 115 by selecting a group of UEs 115 and assigning the group a shared (common) time slot for uplink transmissions. For example, base station 105-a may select UE 115-a and UE 115-b as a group and send a scheduling assignment (e.g., via downlink 205-a and downlink 205-b) indicating that UE 115-a and UE 115-b are scheduled to transmit in the same subframe. The scheduling assignment may be sent to UE 115-a and UE 115-b at the same time or different times. Based on the scheduling assignment, UE 115-a and UE 115-b may transmit respective uplink control traffic to base station 105-a in the same subframe. Base station 105-a may use receive beamforming (e.g., analog beamforming) to receive the subframe. For example, base station 105-a may design a special beam shape that is based on the group of UEs 115. In some cases, the beam may be shaped according to the locations of the UEs 115 with respect to the base station 105-a. In this or other cases, the beam may be shaped according to the locations of the UEs 115 with respect to each other. The beam shape may be a function of the angle of arrival of signals from each respective UE 115 in the group. In this or other cases, the beam shape may be designed based on the channel SNR associated with each UE.

Figure 3:
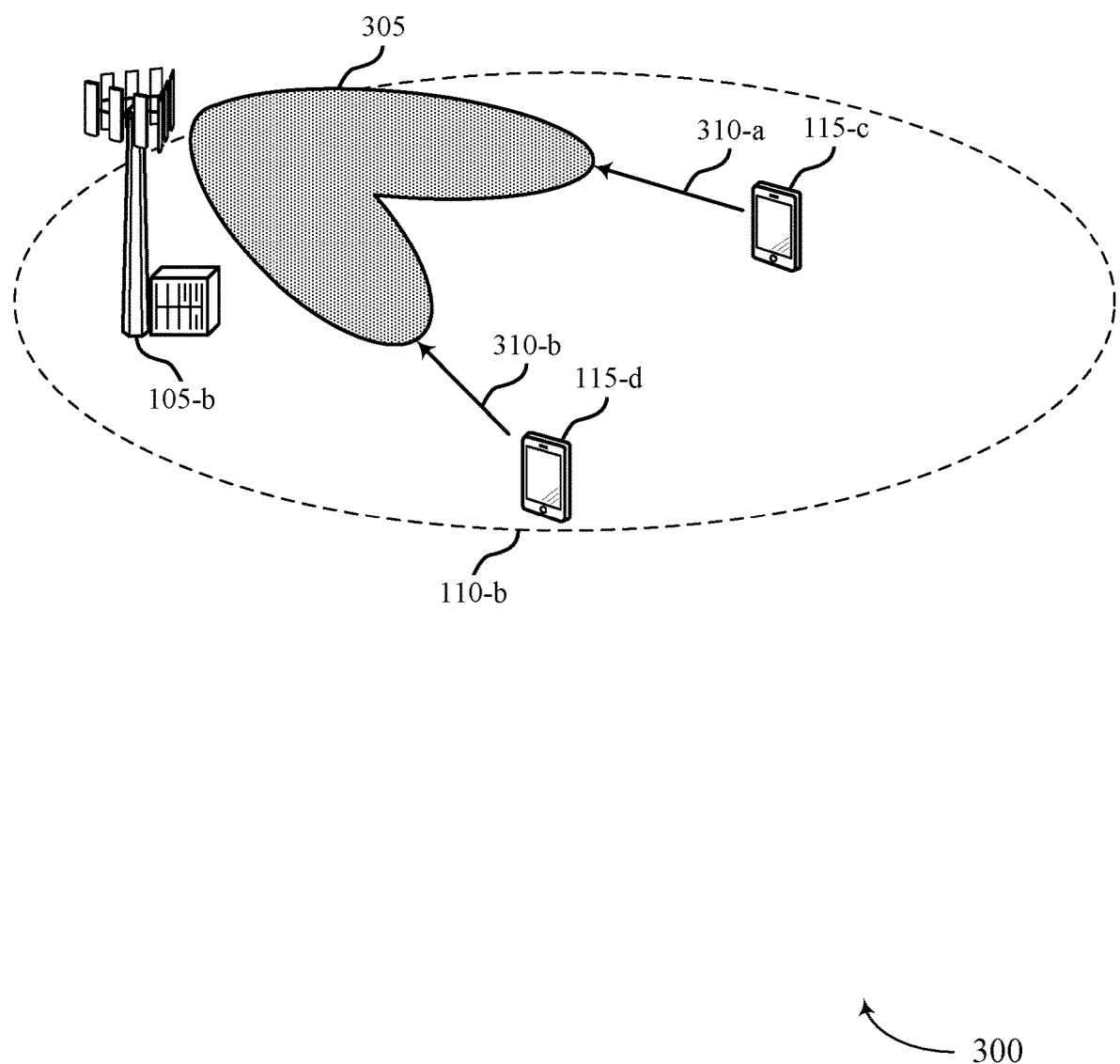
FIG. 3 illustrates an example of a wireless communications subsystem that supports reception of multiple uplink control messages at a same time slot in accordance with various aspects of the present disclosure.

FIG. 3 illustrates an example of a wireless communications subsystem 300 that supports reception of multiple uplink control messages at a same time slot in accordance with various aspects of the present disclosure. Wireless communications subsystem 300 may support the use of a single receive beam to receive uplink signals from multiple devices (e.g., UEs 115) at the same time. The receive beam may be shaped to provide gain for devices based on location, SNR, priority, etc. Wireless communications subsystem 300 may include base station 105-b, UE 115-c, and UE 115-d, which may be examples of a base station 105 and UEs 115 described with reference to FIGS. 1 and 2. Base station 105-b may communicate with UEs 115 that are within coverage area 110-b (e.g., UE 115-c and UE 115-d).

Base station 105-b may select a group of UEs 115 that are in close proximity to one another for simultaneous uplink transmissions. For example, base station 105-b may select UE 115-c and UE 115-d for a simultaneous uplink transmission based on their respective locations (as determined by evaluating the angle of arrival for signals from each UE 115). Base station 105-b may transmit control information (e.g., a scheduling assignment) to each UE in the group that indicates which time slot is reserved for uplink transmission by the group. For instance, base station 105-b may transmit a scheduling assignment that indicates to UE 115-c and UE 115-d an uplink transmission time slot available for use. In some cases, base station 105-b may also indicate to UE 115-c and UE 115-d that the time slot will be shared. This indication may prompt the UEs 115 to use frequency-orthogonal or spreading code-orthogonal uplink resources for uplink control traffic communicated during the shared time slot. In some cases, base station 105-b may use a tone index to explicitly instruct the UEs 115 which frequency resources to use during the time slot. In some cases, base station 105-b may instruct the UEs 115 to use orthogonal spreading sequences for the uplink signals during the shared time slot. The orthogonal spreading sequences may be pre-determined or assigned by base station 105-b.

According to the scheduling assignment, UE 115-c and UE 115-d may transmit uplink control traffic 310-a and 310-b, respectively, to base station 105-b. That is, UE 115-c and UE 115-d may transmit uplink control traffic to base station 105-b in the same time slot (e.g., subframe). The uplink control traffic 310 may be sent using tones that are orthogonal to one another. In certain scenarios, the uplink control traffic 310 may be applied with orthogonal spreading sequences that are unique for each UE 115. In some cases, instead of transmitting the uplink control traffic 310, UE 115-c and UE 115-d may transmit user data. The uplink control traffic may also, or alternatively, include control information (e.g., ACK/NACKs, CQIs, etc.). The uplink control traffic 310 may be in response to downlink traffic from base station 105-b. Downlink traffic from base station 105-b may be conveyed by two different beams (not shown) to UE 115-c and UE 115-d; thus, the simultaneous transmission by multiple UEs 115 may be in response to signals from disparate beams (e.g., unicast beams).

Base station 105-b may use analog beamforming to receive the simultaneous uplink transmissions. For example, base station 105-b may use a receive beam 305 with a special shape that corresponds to the UE 115 group for reception of the shared time slot. The shape of receive beam 305 may be determined using the locations of the UEs 115 in the group. For example, the receive beam 305 may be generated so that the portions of the beam 305 that provide the greatest gain are directed towards UE 115-c and UE 115-d. Thus, messages from different UEs 115 that are included in the same time slot may be received simultaneously using a single receive beam 305.

In some cases, UEs 115 may be grouped based on SNR. The shape of receive beam 305 may also, or alternatively, be based on SNR. Such scenarios may be supported by the devices shown in FIGS. 4A and 4B.

Figure 4A:
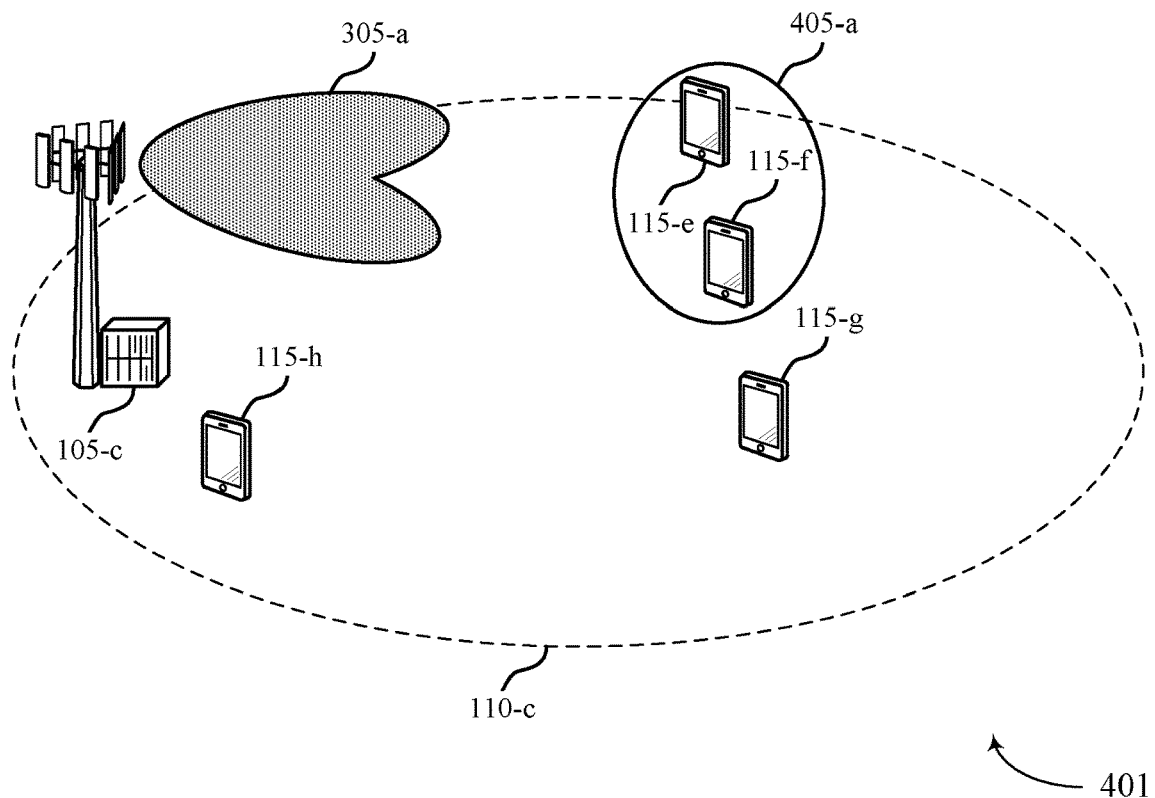
FIG. 4A illustrates an example of a wireless communications subsystem that supports reception of multiple uplink control messages at a same time slot in accordance with various aspects of the present disclosure.

FIG. 4A illustrates an example of a wireless communications subsystem 401 that supports reception of multiple uplink control messages at a same time slot in accordance with various aspects of the present disclosure. Wireless communications subsystem 401 may include base station 105-c. Base station 105-c may select a group of UEs 115 for transmissions of uplink control messages in a common time slot. For example, base station 105-c may form a UE group 405-a using UE 115-e and UE 115-f. Base station 105-c may form the UE group 405-a based on the proximity of the UEs 115 to one another. In some cases, base station 105-c may form the UE group 405-a based on the angle of arrival for signals from each of the UEs 115 in coverage area 110-c. For example, base station 105-c may measure the angle of arrival (e.g., the azimuthal angle) for signals from each UE 115 and select the UEs 115 with similar angles for a UE group 405.

In some cases, base station 105-c may also consider the SNRs associated with each UE 115 during the selection process. In the present example, UE 115-e and UE 115-g may each be within close proximity to UE 115-f. However, UE 115-e may have a higher SNR than UE 115-g. Thus, base station 105-c may need more gain to receive a transmission from UE 115-g than from UE 115-e. In such a scenario, base station 105-c may select UE 115-e as a partner for UE 115-f over UE 115-g with the expectation that the gain from receive beam 305-a will be sufficient to receive simultaneous uplink transmissions from UE 115-e. Thus, when several UEs are within close proximity to one another, the UEs 115 that are associated with high SNRs may be selected for a UE group 405 over UEs 115 with low SNRs. Although UE group 405-a is shown including two UEs 115, other numbers of UEs 115 may be used to form a UE group 405 (e.g., UE group 405-a may include UE 115-e, UE 115-f, and UE 115-g).

Figure 4B:
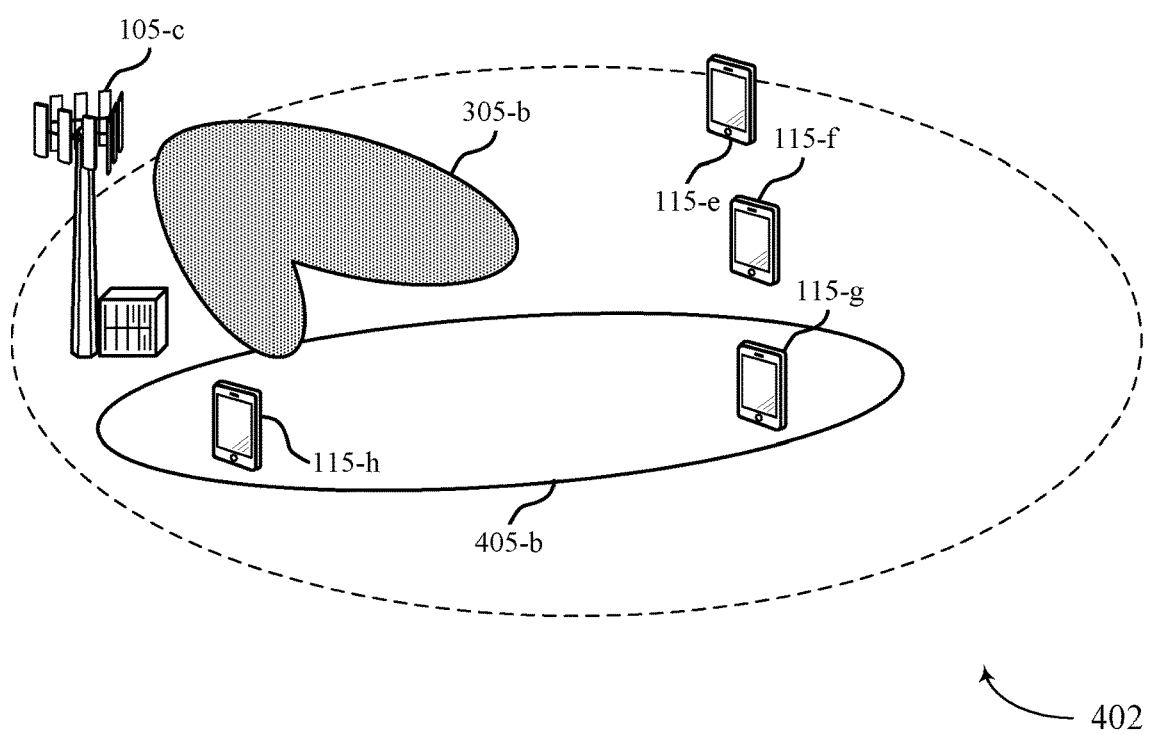
FIG. 4B illustrates an example of a wireless communications subsystem that supports reception of multiple uplink control messages at a same time slot in accordance with various aspects of the present disclosure.

FIG. 4B illustrates an example of a wireless communications subsystem 402 that supports reception of multiple uplink control messages at a same time slot in accordance with various aspects of the present disclosure. Wireless communications subsystem 402 may show an alternative UE group 405-b for simultaneous uplink transmissions. UE group 405-b may be selected by base station 105-c and include UE 115-g and UE 115-h. UE group 405-b may be selected based on position, and/or SNR. For example, UE 115-h may be grouped with UE 115-g (even though UE 115-h is not in close proximity to UE 115-g) if the SNR of UE 115-h satisfies a certain threshold. In the current simultaneous transmission scenario, the threshold may be such that messages from UE 115-h are likely to be successfully received at base station 105-c even when the majority of the gain of the receive beam 305-b is directed towards UE 115-g. That is, the base station 105-c may direct a significant portion of the gain towards UE 115-g with the expectation that the SNR of UE 115-h will be high enough that messages from UE 115-h are successfully received using a low-gain and/or offset lobe of receive beam 305-b. Thus, a UE group 405 may be selected, and a receive beam 305 shape may be designed, based on the positioning of the UEs 115 relative to each other, relative to the base station 105, and/or based on the SNRs associated with each UE.

In some cases, UE group 405-b may also be selected based on the number of downlink messages transmitted to each UE 115. When a UE 115 receives multiple downlink messages, the UE 115 may respond to each downlink message with an ACK/NACK; that is, the UE 115 may send an ACK/NACK for each received downlink message. Thus, a UE 115 may send multiple ACK/NACKs in a single time slot (e.g., subframe). The UE 115 may send multiple messages (e.g., ACK/NACKs) in a time slot by distributing the transmission power between each of the messages. Such distribution of power may decrease the SNR of the signal. Accordingly, a base station 105 may use more gain to receive the signal than when a single message is sent. A base station 105 may recognize when it has sent multiple downlink messages to a UE 115 and design the shape of the receive beam so that a high gain is directed in the direction of the UE 115, thereby compensating for the lower SNR. Therefore, a base station 105 may determine UE groups 405 and design the shape of a receive beam 305 based on the SNRs of the UEs 115.

In the present example, base station 105-c may send data and/or control information messages to UE 115-g and UE 115-h. In some cases, the control information includes an indication of orthogonal tones to be used by UE 115-g and UE 115-h. Base station 105-c may determine the SNRs for each UE 115 in the UE group 405-b and design the shape of the receive beam 305 to compensate for discrepancies in the SNRs. For example, base station 105-c may determine that UE 115-g has a lower SNR than UE 115-h and shape the receive beam 305-b so that more gain is directed towards UE 115-g than UE 115-h. Thus, the shape of a receive beam 305 may be formed based on the SNRs of the UEs in a UE group 405.

Figure 5A:
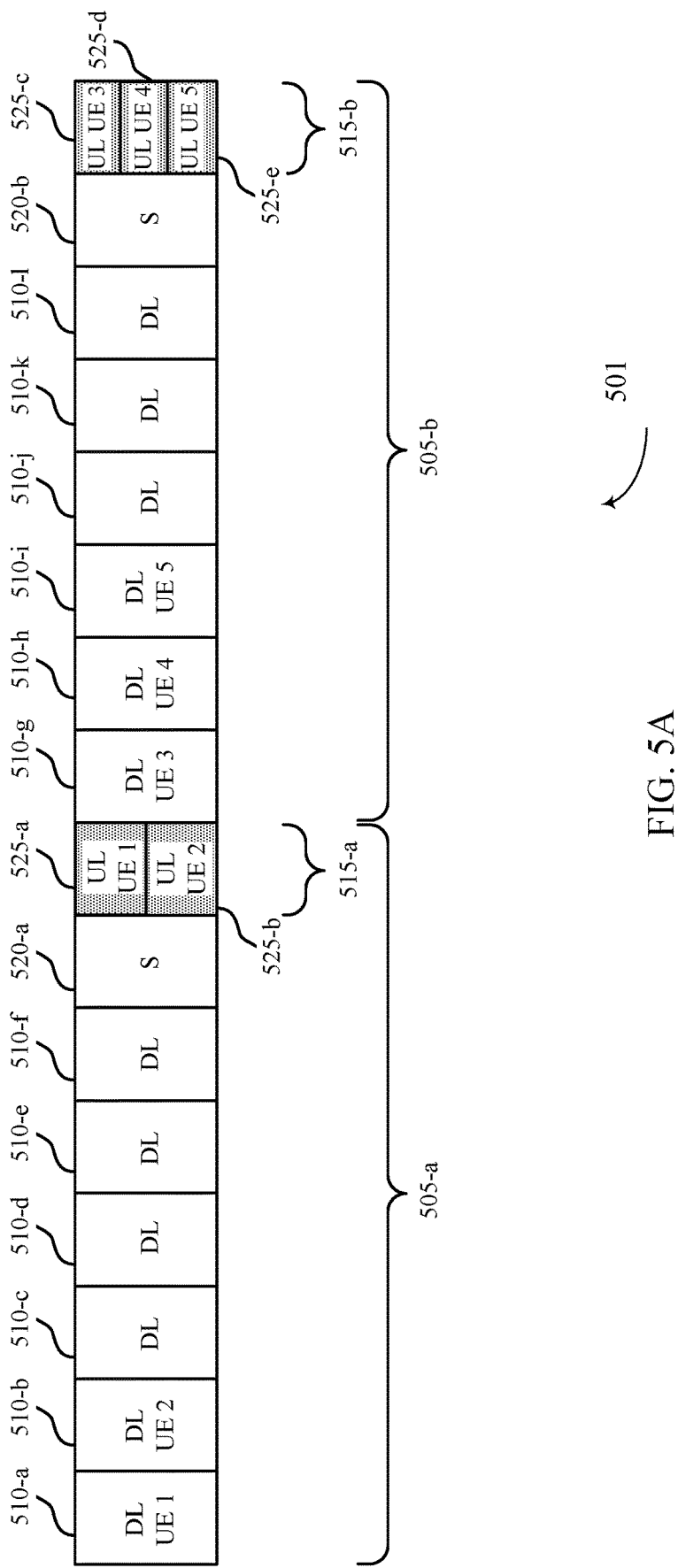
FIG. 5A illustrates an example of a radio frame structure that supports reception of multiple uplink control messages at a same time slot in accordance with various aspects of the present disclosure.

FIG. 5A illustrates an example of a radio frame structure 501 that supports reception of multiple uplink control messages at a same time slot in accordance with various aspects of the present disclosure. Radio frame structure 501 may include a radio frame 505-*a* and a radio frame 505-*b*. Each radio frame 505 may include a number of downlink (DL) subframes 510 and a number of uplink (UL) subframes 515. The radio frames 505 may also include special subframes 520 for switching between DL subframes 510 and UL subframes 515 or vice versa. Radio frame 505-*a* and radio frame 505-*b* may be examples of radio frames sent between a base station 105 and a UE 115 as described in FIGS. 1-4B. The duration of each subframe may be referred to as a time slot.

In the present example a base station 105 may transmit a DL subframe 510-*a* to UE 1. In the next time slot, the base station 105 may transmit a DL subframe 510-*b* to UE 2. The DL subframe 510-*a* and the DL subframe 510-*b* may be sent using different beams or the same beam. The DL subframes may include data traffic or control traffic such as described above. Subsequent to DL subframe 510-*b*, the base station 105 may send four downlink subframes, DL subframe 510-*c*, DL subframe 510-*d*, DL subframe 510-*e*, and DL subframe 510-*f*. In some cases, the base station 105 may use one or more of the DL subframes 510-*c* through 510-*f* to carry uplink scheduling information to UE 1 and UE 2. The scheduling information may include indications of a time slot and tones (frequencies) to be used for uplink transmissions by UE 1 and UE 2. For example, the base station 105 may send scheduling information that indicates a shared uplink time slot (e.g., UL subframe 515-*a*) to be used by UE 1 and UE 2. The scheduling information may also include a tone index that indicates which tone each UE should use to transmit the uplink control traffic.

The downlink subframes DL subframe 510-*c* through DL subframe 510-*f* may additionally or alternatively carry downlink information for other UEs. After DL subframe 510-*f*, the base station 105 may send a special subframe 520-*a* prior to receiving UL subframe 515-*a*. UL subframe 515-*a* may include uplink control traffic 525-*a* from UE 1 and uplink control traffic 525-*b* from UE 2. For example, the uplink control traffic 525 may include ACK/NACKs that correspond to the DL subframe 510-*a* and the DL subframe 510-*b* (each of which may be conveyed by a single respective beam). In some cases, the uplink control traffic 525 may include ACK/NACKs for messages received from other DL subframes (e.g., DL subframes 510-*c* through 510-*f*, or other DL subframes (not shown)). UE 1 and UE 2 may send the uplink control traffic based on the scheduling information from the base station 105. For example, the uplink control traffic 525-*a* may be sent in a tone that is orthogonal to uplink control traffic 525-*b* in the frequency domain (e.g., the traffic from UE 1 may be frequency-orthogonal to that of UE 2). Thus, UE 1 and UE 2 may both send uplink control messages to the base station in the same time slot (e.g., UL subframe 515-*a*). The uplink control messages may be sent in response to data or control information conveyed by unicast, multi-cast, or broadcast beams.

Radio frame 505-*b* may include DL subframe 510-*g* through DL subframe 510-1. DL subframe 510-*g* may include downlink traffic for a UE 3, DL subframe 510-*h* may include downlink traffic for a UE 4, and DL subframe 510-*i* may include downlink traffic for a UE 5. The downlink traffic may include data and control information such as described above and with respect to FIGS. 1-4B. The special subframe 520-*b* may be used to separate the downlink subframes (e.g., DL subframe 510-1) and uplink subframes (e.g., UL subframe 515-*b*). UL subframe 515-*b* may include uplink control traffic from UE 3, UE 4, and UE 5; that is, UL subframe 515-*b* may include uplink control traffic 525-*c* from UE 3, uplink control traffic 525-*d* from UE 4, and uplink control traffic 525-*e* from UE 5. The uplink control traffic 525 may be sent in response to downlink traffic conveyed by a DL subframe 510. The uplink control traffic 525 may be conveyed in tones that are frequency-orthogonal. Thus, multiple UEs may send frequency-orthogonal uplink control traffic in the same time slot according to scheduling information from a base station 105. However, in some cases simultaneous, frequency-orthogonal uplink transmissions by multiple UEs may be transmitted independent of base station instructions.

Figure 5B:
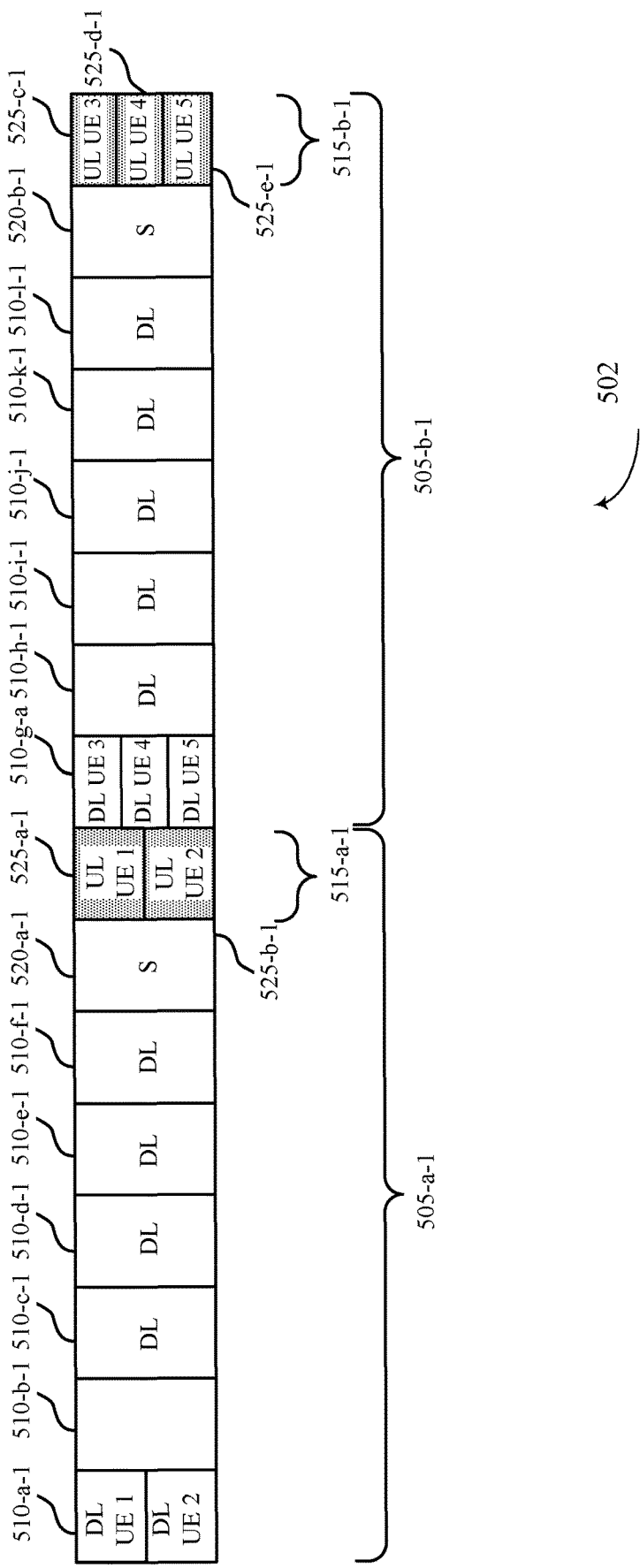
FIG. 5B illustrates an example of a radio frame structure that supports reception of multiple uplink control messages at a same time slot in accordance with various aspects of the present disclosure.

FIG. 5B illustrates an example of a radio frame structure 502 that supports reception of multiple uplink control messages at a same time slot in accordance with various aspects of the present disclosure. Radio frame structure 502 may include a radio frame 505-*a*-1 and a radio frame 505-*b*-1, which may be examples of a radio frame 505-*a* and radio frame 505-*b*-1 described with reference to FIG. 5A. Radio frame 505-*a*-1 may include subframes 510-*a*-1 through 510-*f*-1, special subframe 520-*a*-1, and UL subframe 515-*a*-1. Radio frame 505-*b*-1 may include DL subframes 510-*g*-1 through 510-1-1, special subframe 520-*b*-1, and UL subframe 515-*b*-1.

A base station 105 may transmit downlink traffic to UE 1 in DL subframe 510-*a*-1 and downlink traffic to UE 2 in DL subframe 510-*b*-1. That is, the base station 105 may send downlink traffic intended for multiple UEs simultaneously (e.g., in a shared subframe). In some cases, the downlink traffic is conveyed using two separate beams. UE 1 and UE 2 may be configured to respond to DL messages after a pre-determined amount of time has elapsed. For example, a UE may respond to a downlink message in the Nth subframe after the downlink message has been received. The responses may be transmitted irrespective of scheduling from the base station. In the present example, UE 1 and UE 2 may be configured to respond to a downlink message using the 7th subframe from the subframe in which the downlink message was received. Thus, UE 1 and UE 2 may send uplink messages (e.g., uplink control messages) to the base station 105 in UL subframe 515-*a*-1 that correspond to downlink messages received in DL subframe 510-1-*a*. That is, UL subframe 515-*a*-1 may include uplink control traffic 525-*a*-1 from UE 1 and uplink control traffic 525-*b*-1 from UE 2. The uplink control traffic 525-*a*-1 may be orthogonal to the uplink control traffic 525-*b*-1 in the frequency domain. For example, the uplink control traffic 525 may be conveyed in tones that are frequency-orthogonal. In some cases, the tones to be used for uplink transmission may be indicated by the base station 105 in a scheduling assignment. In other cases, the tones are predetermined or learned from another wireless device.

The base station 105 may use DL subframe 510-*g* through DL subframe 510-1-1 in radio frame 505-*b*-1 to convey downlink information to multiple UEs. In some cases, the base station may send downlink traffic to multiple UEs in the same subframe. For example, DL subframe 510-*g*-1 may include downlink traffic for UE 3, UE 4, and UE 5. Each of the UEs may be configured to transmit uplink response messages according to a predetermined schedule (e.g., irrespective of base station involvement). The predetermined schedule may instruct the UEs to respond to downlink messages according to a time or subframe offset with respect to the corresponding downlink subframes. In the present example, the UEs may be assigned the 7th subframe after DL subframe 510-*g* to respond to the downlink traffic in DL subframe 510-*g*. Thus, uplink control traffic 525-*c*-1 for UE 3, uplink control traffic 525-*d*-1 for UE 4, and uplink control traffic 525-*e*-1 for UE 5 may be transmitted in UL subframe 515-b-1. The uplink control traffic 525 may be frequency-orthogonal or spreading code-orthogonal. In other cases, the predetermined schedule may assign the UEs to respond in a particular subframe regardless of when the corresponding downlink traffic is received. In some cases, the predetermined schedule may be updated using information from the base station 105 or another wireless device. Thus, multiple UEs may autonomously send uplink control traffic to a base station 105 simultaneously.

Although the present example is shown using a particular subframe configuration (six downlink subframes followed by an uplink subframe, with a special subframe in between), other configurations may be used when implementing the techniques described herein.

Figure 6:
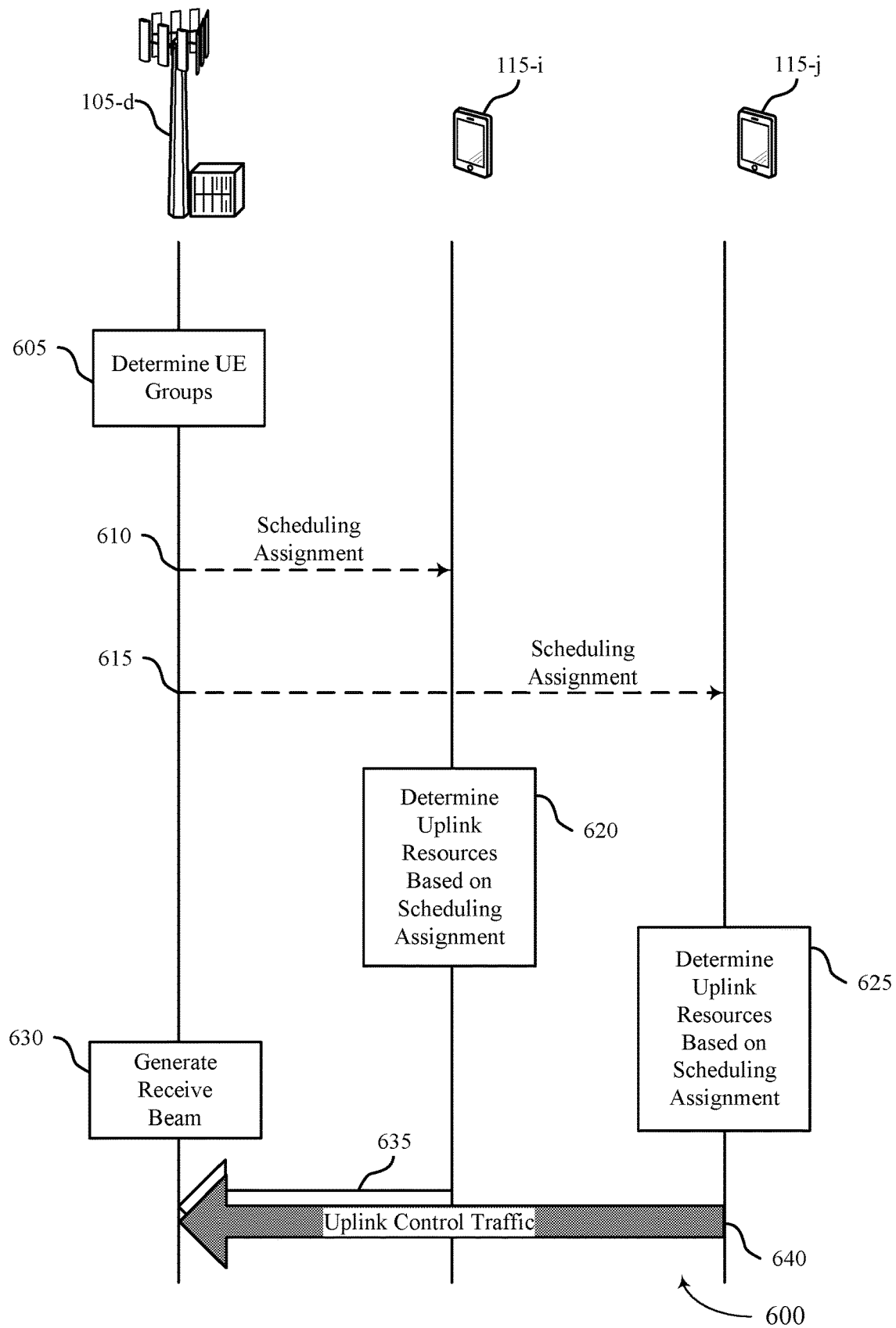
FIG. 6 illustrates an example of a process flow that supports reception of multiple uplink control messages at a same time slot in accordance with various aspects of the present disclosure.

FIG. 6 illustrates an example of a process flow 600 for reception of multiple uplink control messages at a same time slot in accordance with various aspects of the present disclosure. Process flow 600 may include UE 115-*i*, UE 115-*j*, and base station 105-*d*, which may be examples of a UE 115 and base station 105 described with reference to FIGS. 1-5B. Base station 105-*d*, UE 115-*i*, and UE 115-*j* may use millimeter waveforms for communications. Additionally, base station 105-*d*, UE 115-*i*, and UE 115-*j* may use analog beamforming techniques for communications.

At 605, base station 105-*d* may determine a group of UEs for simultaneous uplink transmission. For example, base station 105-*d* may select UE 115-*i* and UE 115-*j* to transmit uplink control messages in a shared time slot. The selection may be based on the location and/or SNR of candidate UEs 115 within the coverage area of base station 105-*d*. The selection may also be based on the number of downlink messages (e.g., resource blocks) sent to each UE 115. At 610, base station 105-*d* may send a scheduling assignment to UE 115-*i*. The scheduling assignment may include scheduling information that indicates a time slot in which UE 115-*i* may transmit uplink messages (e.g., uplink control messages). The scheduling information may also indicate which frequency tone UE 115-*i* may use during the time slot. At 615, base station 105-*d* may send a scheduling assignment to UE 115-*j*. The scheduling assignment may include scheduling information that indicates a time slot in which UE 115-*j* may transmit uplink messages (e.g., uplink control messages). The scheduling information may also indicate which frequency tone UE 115-*j* may use during the time slot. The tones used by UE 115-*i* and UE 115-*j* may be substantially orthogonal in the frequency domain. In some cases, the scheduling assignments occur at the same time (e.g., in a shared time slot using the same or different beams). In other cases, the scheduling assignments may not be sent and the UEs may autonomously implement the simultaneous uplink transmission techniques described herein.

At 620, UE 115-*i* may determine time and frequency resources for an uplink transmission based on the information conveyed by the scheduling assignment received at 610. At 625, UE 115-*j* may determine time and frequency resources for an uplink transmission based on the information conveyed by the scheduling assignment received at 615 (e.g., the time and frequency resources may be indicated by the scheduling assignment from base station 105-*d*). In some cases, the time and frequency resources may be predetermined. At 630, base station 105-*d* may generate a receive beam for reception of expected uplink control traffic from UE 115-*i* and UE 115-*j*. The receive beam may be shaped and/or directed based on the position and/or SNR of UE 115-*i* and UE 115-*j*. In some cases, the receive beam maybe shaped and/or directed based on the priorities of UE 115-*i* and UE 115-*j*. In some examples, the receive beam maybe shaped and/or directed based on the type or priority of the uplink control traffic from UE 115-*i* and UE 115-*j*.

At 635, UE 115-*i* may transmit uplink control traffic to base station 105-*d* using the resources determined at 620. At 640, UE 115-*j* may transmit uplink control traffic to base station 105-*d* using the resources determined at 625. The transmissions may be simultaneous; that is, UE 115-*i* and UE 115-*j* may use a common transmission time slot (e.g., subframe). UE 115-*i* and UE 115-*j* may use orthogonal frequency tones to convey respective messages during the common time slot. In some cases, the uplink control traffic include control information such as ACK/NACKs or CQI.

Figure 7:
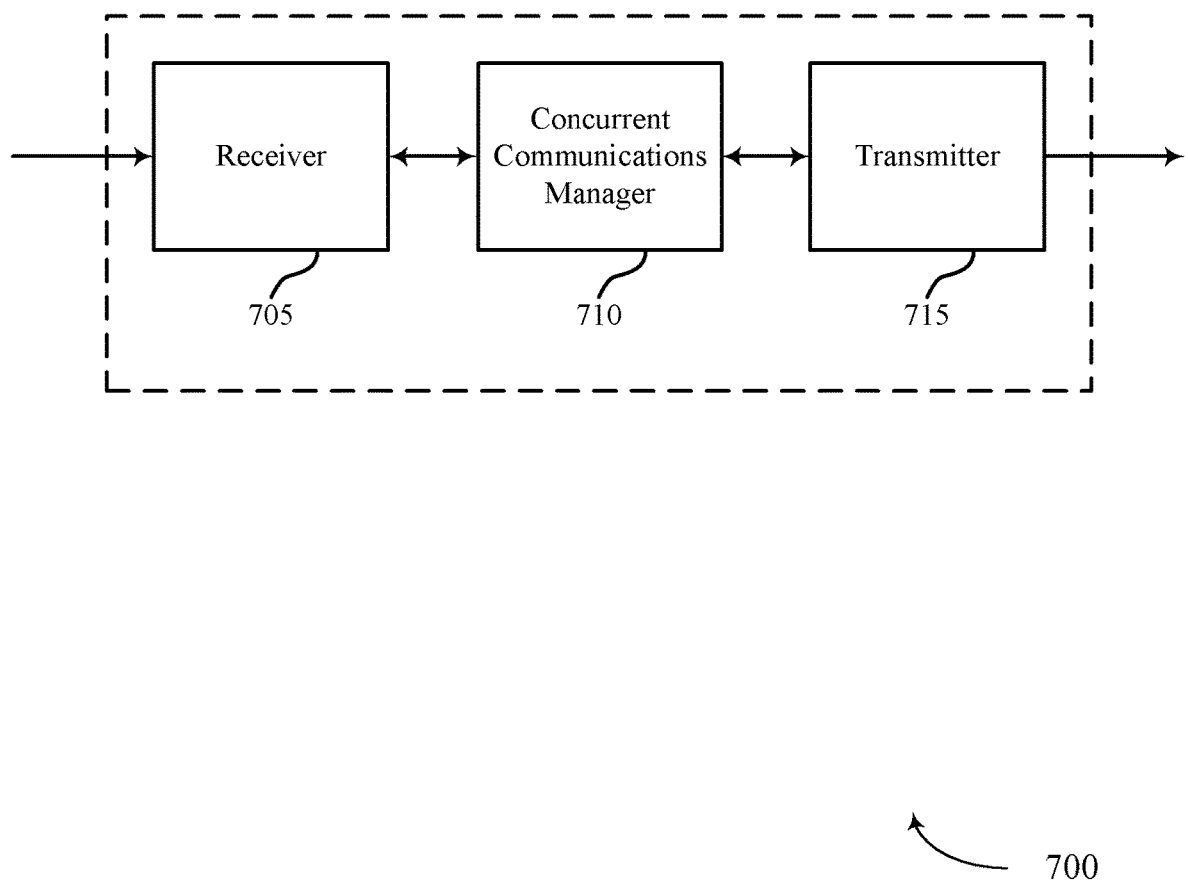
FIG. 7 shows a block diagram of a wireless device that supports transmission of uplink control messages at a same time slot as that used by other wireless devices communicating with a same base station in accordance with various aspects of the present disclosure.

FIG. 7 shows a block diagram of a wireless device 700 configured for transmission of uplink control messages at a same time slot as that used by other wireless devices communicating with a same base station, in accordance with various aspects of the present disclosure. Wireless device 700 may be an example of aspects of a UE 115 described with reference to FIGS. 1-6. Wireless device 700 may include a receiver 705, a concurrent communications manager 710, or a transmitter 715. Wireless device 700 may also include a processor. Each of these components may be in communication with each other.

The receiver 705 may receive information such as packets, user data, or control information associated with various information channels (e.g., control channels, data channels, and information related to reception of multiple uplink control messages at a same time slot, etc.). Information may be passed on to the concurrent communications manager 710, and to other components of wireless device 700. In some cases, the receiver 705 may receive downlink messages from a base station 105. The downlink messages may be conveyed by a unicast, multicast, or broadcast beam. In some examples, the receiver 705 receives downlink traffic from a base station 105 using analog beamforming and/or millimeter waveforms.

The transmitter 715 may transmit signals received from other components of wireless device 700. In some examples, the transmitter 715 may be collocated with the receiver 705 in a transceiver module. The transmitter 715 may include a single antenna, or it may include a plurality of antennas. In some cases, the transmitter 715 may send uplink messages (e.g., uplink control messages) to a base station 105. In some examples, the transmitter 715 sends uplink control traffic to a base station 105 using analog beamforming and/or millimeter waveforms.

The concurrent communications manager 710 may collaborate with the receiver 705 to receive one or more first downlink messages in a first beam from a base station 105. The concurrent communications manager 710 may collaborate with the transmitter 715 to transmit, in response to the reception of the one or more downlink messages, one or more first uplink control messages to the base station 105 in a time slot. The one or more first uplink control messages may be frequency-orthogonal or spreading code-orthogonal to one or more second uplink control messages that are transmitted from another wireless device (e.g., UE 115) in the same time slot.

Figure 8:
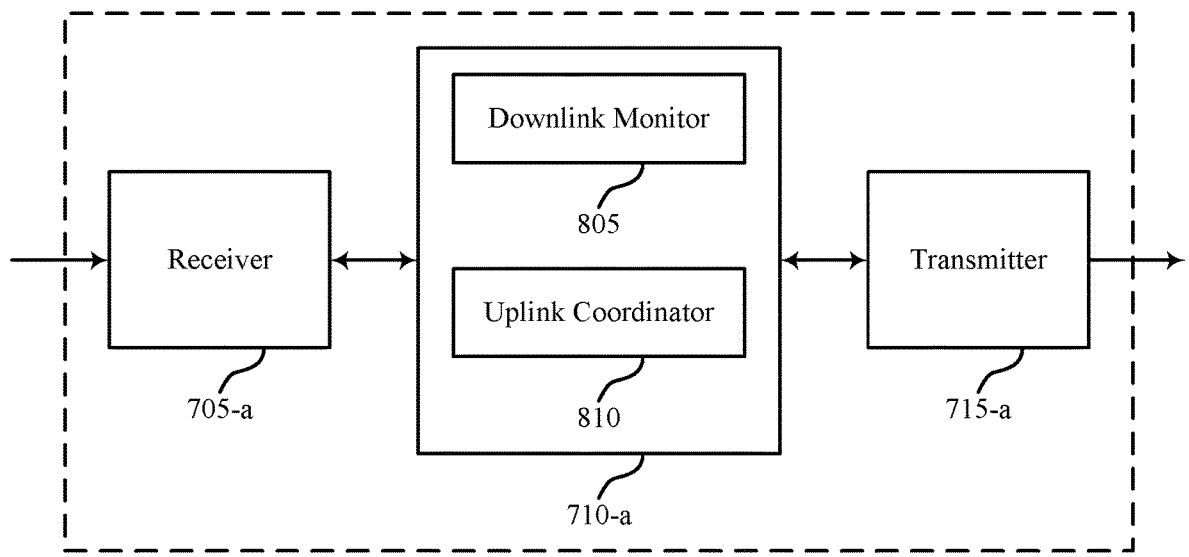
FIG. 8 shows a block diagram of a wireless device that supports transmission of uplink control messages at a same time slot as that used by other wireless devices communicating with a same base station in accordance with various aspects of the present disclosure.

FIG. 8 shows a block diagram of a wireless device 800 for transmission of uplink control messages at a same time slot as that used by other wireless devices communicating with a same base station, in accordance with various aspects of the present disclosure. Wireless device 800 may be an example of aspects of a wireless device 700 or a UE 115 described with reference to FIGS. 1-7. Wireless device 800 may include a receiver 705-*a*, a concurrent communications manager 710-*a*, or a transmitter 715-*a*. Wireless device 800 may also include a processor. Each of these components may be in communication with each other. The concurrent communications manager 710-a may also include a downlink monitor 805 and an uplink coordinator 810.

The receiver 705-a may receive information (e.g., in downlink messages) which may be passed on to concurrent communications manager 710-a, and to other components of wireless device 800. The concurrent communications manager 710-a may perform the operations described with reference to FIG. 7. The transmitter 715-a may transmit signals (e.g., in uplink control messages) received from other components of wireless device 800.

The downlink monitor 805 may collaborate with the receiver 705-a to receive one or more first downlink messages in a first beam as described with reference to FIGS. 2-6. The uplink coordinator 810 may collaborate with the transmitter 715-a to transmit, in response to the reception of the one or more downlink messages, one or more first uplink control messages to the base station 105 in a time slot. The one or more first uplink control messages may be orthogonal in the frequency domain to one or more second uplink control messages that are transmitted to the base station 105 from another wireless device (e.g., UE 115) in the same time slot. In some examples, the one or more first downlink messages include data and the one or more first uplink control messages include ACK/NACK(s) associated with the one or more first downlink messages. In some examples, the one or more first downlink messages include control information and the one or more first uplink control messages include ACK/NACK(s) associated with the one or more first downlink messages, or a CQI.

In some cases, the wireless device 800 is selected from a group of devices for simultaneous transmission with a second device (e.g., a UE 115). The simultaneous transmissions may be frequency-orthogonal or spreading code-orthogonal messages sent in a common time slot. In some examples, the wireless device 800 is selected based on the arrival angle of a signal sent from the wireless device 800 and received at a base station 105. In some examples, the wireless device 800 is selected based on the SNR for the channel used by the wireless device 800 to transmit uplink control traffic to the base station 105. In some cases, the wireless device 800 is selected based on the number of RBs that are received by the wireless device 800 from the base station 105.

The uplink coordinator 810 may collaborate with the downlink monitor 805 to determine communication resources for a simultaneous uplink transmission. For example, the downlink monitor 805 may receive scheduling information from the base station 105 that indicates the time slot and frequency tone the wireless device 800 may use to transmit an uplink message (e.g., an uplink control message). The frequency tone may be indicated by a tone index included in the scheduling information. The downlink monitor 805 may pass the scheduling information to the uplink coordinator 810, which may use the scheduling information to generate an uplink message (e.g., an uplink control message) to be transmitted in the indicated time slot using the indicated tone.

The components of wireless device 700, wireless device 800, and concurrent communications manager 710 may, individually or collectively, be implemented with at least one application specific integrated circuit (ASIC) adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 9:
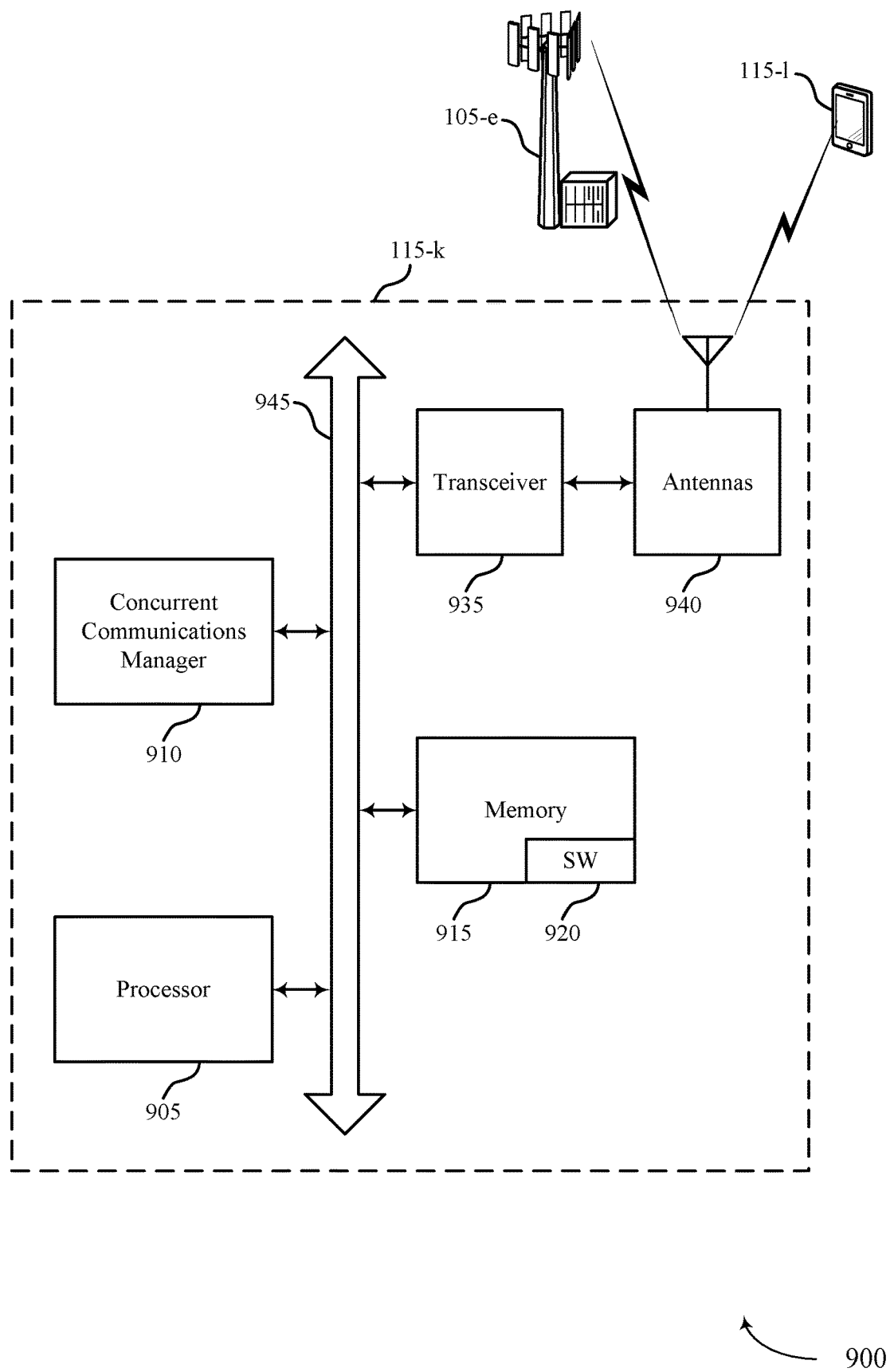
FIG. 9 illustrates a block diagram of a system including a user equipment (UE) that supports transmission of uplink control messages at a same time slot as that used by other wireless devices communicating with a same base station in accordance with various aspects of the present disclosure.

FIG. 9 shows a diagram of a system 900 including UE 115-k configured for transmission of uplink control messages at a same time slot as that used by other UEs communicating with a same base station, in accordance with various aspects of the present disclosure. UE 115-k may be an example of a wireless device 700, a wireless device 800, or a UE 115 described with reference to FIGS. 1-8. UE 115-k may include a concurrent communications manager 910, which may be an example of a concurrent communications manager 710 described with reference to FIGS. 7-9. UE 115-k may also include components for bi-directional voice and data communications including components for transmitting communications and components for receiving communications. For example, UE 115-k may communicate bi-directionally with UE 115-1 or base station 105-e.

UE 115-k may also include a processor 905, and memory 915 (including software/firmware code 920), a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-k may include a single antenna 940, UE 115-k may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., reception of multiple uplink control messages at a same time slot, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an ASIC, etc.).

Figure 10:
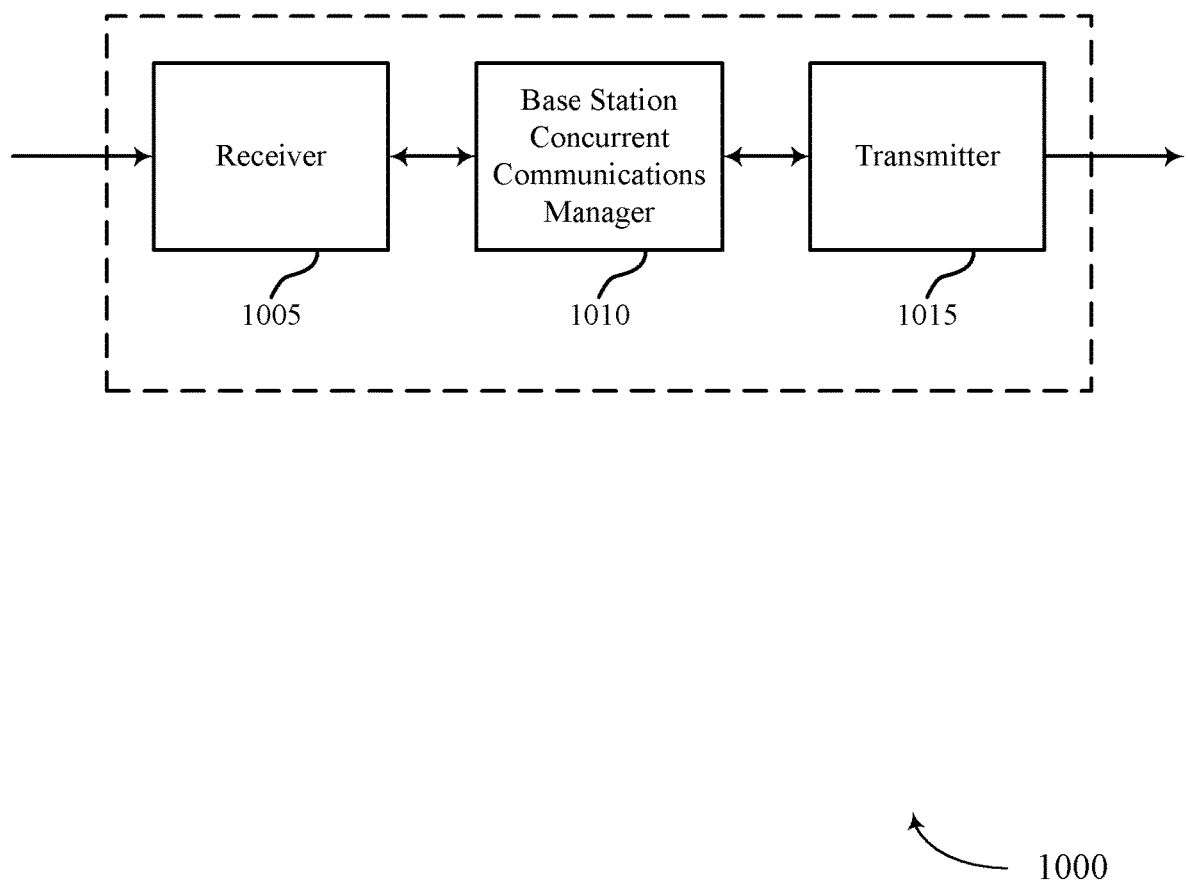
FIG. 10 shows a block diagram of a wireless device that supports reception of multiple uplink control messages at a same time slot in accordance with various aspects of the present disclosure.

FIG. 10 shows a block diagram of a wireless device 1000 configured for reception of multiple uplink control messages at a same time slot in accordance with various aspects of the present disclosure. Wireless device 1000 may be an example of aspects of a base station 105 described with reference to FIGS. 1-6. Wireless device 1000 may include a receiver 1005, a base station concurrent communications manager 1010, or a transmitter 1015. Wireless device 1000 may also include a processor. Each of these components may be in communication with each other.

The receiver 1005 may receive information such as packets, user data, or control information associated with various information channels (e.g., control channels, data channels, and information related to reception of multiple uplink control messages at a same time slot, etc.). Information may be passed on to the base station concurrent communications manager 1010, and to other components of wireless device 1000. In some cases, the receiver 1005 may receive messages from multiple devices (e.g., UEs 115) at the same time. For example, the receiver 1005 may receive a subframe that includes uplink control traffic from multiple UEs 115. In some scenarios, the signals in a subframe may be orthogonal in the frequency domain (e.g., the messages may be conveyed using orthogonal tones). The waveforms received by the receiver 1005 may be millimeter waveforms. In some cases, the receiver 1005 may use analog beamforming to receive uplink signals.

The transmitter 1015 may transmit signals received from other components of wireless device 1000. In some examples, the transmitter 1015 may be collocated with the receiver 1005 in a transceiver module. The transmitter 1015 may include a single antenna, or it may include a plurality of antennas. The transmitter 1015 may transmit downlink messages to multiple devices (e.g., UEs 115). In some cases, the downlink messages are sent concurrently (e.g., in the same time slot). In some cases, the downlink messages are sent to each device using different beams. The transmitter 1015 may transmit downlink signals using millimeter waveforms. In some cases, the transmitter 1015 may leverage analog beamforming to transmit downlink signals.

The base station concurrent communications manager 1010 may collaborate with the transmitter 1015 to transmit one or more first downlink messages to a first UE 115 in a first beam. The base station concurrent communications manager 1010 may collaborate with the transmitter 1015 to transmit one or more second downlink messages to a second UE 115 in a second beam. The base station concurrent communications manager 1010 may collaborate with the receiver 1005 to receive, in response to the transmission of the one or more first downlink messages, one or more first uplink control messages from the first UE 115 in a time slot. The base station concurrent communications manager 1010 may also collaborate with the receiver 1005 to receive, in response to the transmission of the one or more second downlink messages, one or more second uplink control messages from the second UE 115 in the same time slot. In some cases, the one or more second uplink control messages are frequency-orthogonal or spreading code-orthogonal to the one or more first uplink control messages.

Figure 11:
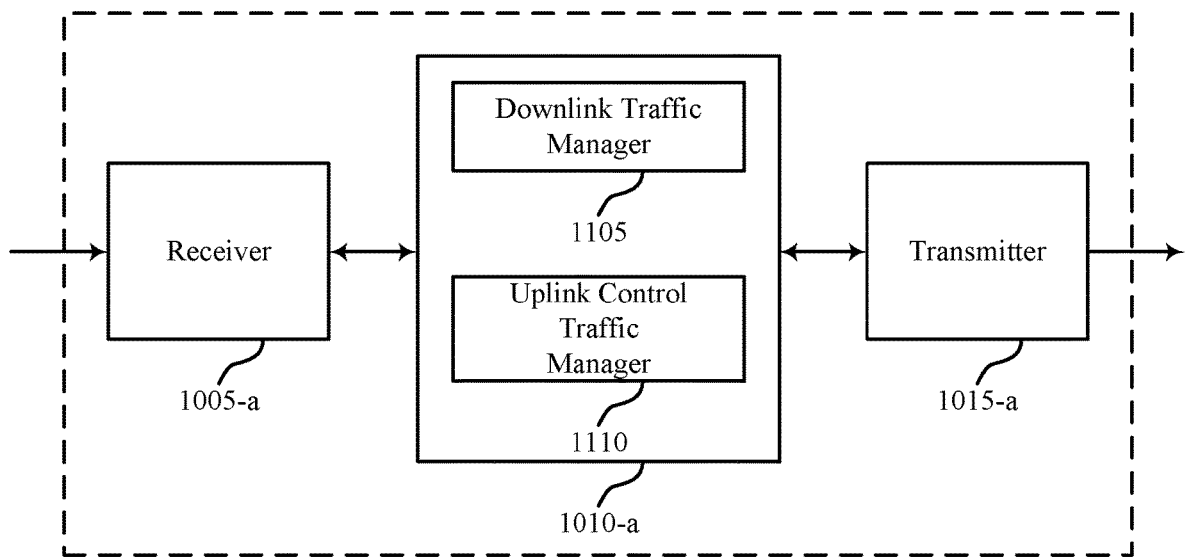
FIG. 11 shows a block diagram of a wireless device that supports reception of multiple uplink control messages at a same time slot in accordance with various aspects of the present disclosure.

FIG. 11 shows a block diagram of a wireless device 1100 for reception of multiple uplink control messages at a same time slot in accordance with various aspects of the present disclosure. Wireless device 1100 may be an example of aspects of a wireless device 1000 or a base station 105 described with reference to FIGS. 1-6 and 10. Wireless device 1100 may include a receiver 1005-a, a base station concurrent communications manager 1010-a, or a transmitter 1015-a. Wireless device 1100 may also include a processor. Each of these components may be in communication with each other. The base station concurrent communications manager 1010-a may also include a downlink traffic manager 1105 and an uplink control traffic manager 1110.

The receiver 1005-a may receive information which may be passed on to base station concurrent communications manager 1010-a, and to other components of wireless device 1000. The base station concurrent communications manager 1010-a may perform the operations described with reference to FIG. 10. The transmitter 1015-a may transmit signals received from other components of wireless device 1100.

The downlink traffic manager 1105 may, in conjunction with the transmitter 1015-a, transmit one or more first downlink messages to a first UE 115 in a first beam as described with reference to FIGS. 2-6. The downlink traffic manager 1105 may also, in conjunction with the transmitter 1015-a, transmit one or more second downlink messages to a second UE in a second beam. In some cases, the one or more first downlink messages and the one or more second downlink messages may be transmitted at the same time.

The uplink control traffic manager 1110 may collaborate with the receiver 1005-a to receive, in response to the transmission of the one or more first downlink messages, one or more first uplink control messages from the first UE in a time slot as described with reference to FIGS. 2-6. The uplink control traffic manager 1110 may also collaborate with the receiver 1005-a to receive, in response to the transmission of the one or more second downlink messages, one or more second uplink control messages from the second UE in the time slot. In some cases, the one or more second uplink control messages are frequency-orthogonal or spreading code-orthogonal to the one or more first uplink control messages.

In some cases, the one or more first downlink messages and the one or more second downlink messages include data, and the one or more first uplink control messages and the one or more second uplink control messages include an ACK/NACK associated with the one or more first downlink messages or the one or more second downlink messages. In some scenarios, the one or more first downlink messages and the one or more second downlink messages include control information, and the one or more first uplink control messages and the one or more second uplink control messages include an ACK/NACK associated with the one or more first downlink messages or the one or more second downlink messages, or a CQI.

Figure 12:
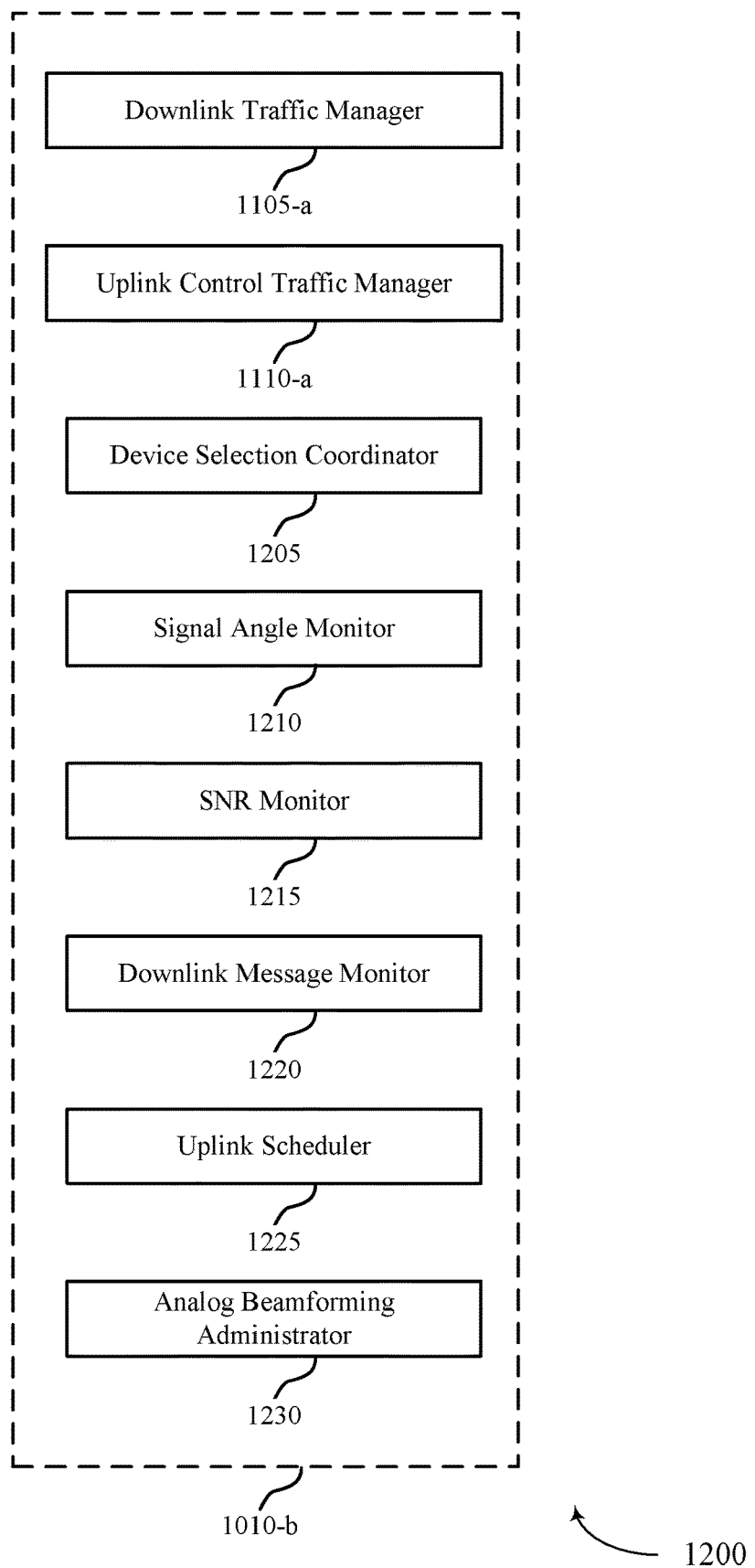
FIG. 12 shows a block diagram of a wireless device that supports reception of multiple uplink control messages at a same time slot in accordance with various aspects of the present disclosure.

FIG. 12 shows a block diagram 1200 of a base station concurrent communications manager 1010-b which may be a component of a wireless device 1000 or a wireless device 1100 for reception of multiple uplink control messages at a same time slot in accordance with various aspects of the present disclosure. The base station concurrent communications manager 1010-b may be an example of aspects of a base station concurrent communications manager 1010 described with reference to FIG. 10 or 11. The base station concurrent communications manager 1010-b may include a downlink traffic manager 1105-a and an uplink control traffic manager 1110-a. Each of these modules may perform the functions described with reference to FIG. 11. The concurrent communications manager 1010-b may also include a device selection coordinator 1205, a signal angle monitor 1210, an SNR monitor 1215, a downlink message monitor 1220, an uplink scheduler 1225, and an analog beamforming administrator 1230.

The device selection coordinator 1205 may select a first UE and a second UE from a group of UEs for transmission of frequency-orthogonal or spreading code-orthogonal messages in a same time slot as described with reference to FIGS. 2-6. For example, the device selection coordinator may evaluate a group of candidate UEs and select a subset of UEs for simultaneous transmissions. The device selection coordinator 1205 may pass information regarding the selected set of UEs to other components of the base station concurrent communications manager 1010-b. In some cases, the device selection coordinator 1205 may collaborate with other components of the base station concurrent communications manager 1010-b to determine which UEs should be selected for concurrent uplink communications.

In one example, the device selection coordinator 1205 may collaborate with the signal angle monitor 1210. The signal angle monitor 1210 may determine (e.g., measure) the angle of arrival for a signal from a UE. In some cases, the signal angle monitor 1210 may compare or evaluate the signal angle of arrival for multiple UEs (e.g., UEs 115 that are candidates for a UE group 405) and determine which UEs 115 are in close proximity. In such cases, the device selection coordinator 1205 may select the UEs 115 that are positioned within a threshold distance from one another. Thus, the first UE and the second UE may be selected based at least in part on respective angles of arrival of signals received from the first UE and the second UE as described with reference to FIGS. 2-6.

In some cases, the device selection coordinator 1205 may, additionally or alternatively, collaborate with the SNR monitor 1215 to select the first UE and the second UE. The SNR monitor 1215 may determine (e.g., measure) the SNR for channels used by the candidate UEs. For example, the SNR monitor 1215 may determine the SNR for a channel associated with the first UE and the SNR for a channel used by the second UE. The device selection coordinator 1205 may select the first UE and the second UE based at least in part on respective SNRs associated with channels used by the first UE and the second UE to communicate uplink control traffic as described with reference to FIGS. 2-6.

In some examples, the device selection coordinator 1205 may, additionally or alternatively, collaborate with the downlink message monitor 1220 to select the first UE and the second UE. The downlink message monitor 1220 may monitor the number of messages (e.g., resource blocks) send to the candidate UEs. For example, the downlink message monitor 1220 may determine the number of resource blocks that are sent to the first UE and the number of resource blocks that are sent to the second UE. Thus, the device selection coordinator 1205 may select the first UE and the second UE based at least in part on a number of downlink resource blocks transmitted to the first UE and the second UE, respectively as described with reference to FIGS. 2-6. In some cases, the device selection coordinator 1205 may select other numbers of UEs 115 for simultaneous uplink transmissions. The device selection coordinator 1205 may select the UE group and dynamically update the UEs based on the above-described parameters.

The device selection coordinator 1205 may pass selection information to the uplink scheduler 1225. The uplink scheduler 1225 may evaluate the selected UEs (and/or communications to and from the selected UEs) to determine an uplink schedule for each UE. The uplink schedule may include the time slot in which the first UE and the second UE are to transmit uplink data. In some cases, the uplink scheduler 1225 may also determine the frequency resources (e.g., tones) the first UE and the second UE are to use for the simultaneous uplink transmission. For example, the uplink scheduler 1225 may select orthogonal tones for use by the first UE and the second UE during the selected time slot. The orthogonal tones may be indicated by a tone index. Subsequent to the selection of uplink resources, the uplink scheduler 1225 may collaborate with a transmitter to transmit scheduling information to the first UE and to the second UE. The scheduling information may indicate the time slot and the tone index that the first UE and the second UE are to use for transmitting the one or more first uplink control messages and the one or more second uplink control messages as described with reference to FIGS. 2-6.

The uplink scheduler 1225 and/or the device selection coordinator 1205, may collaborate with the analog beamforming administrator 1230 in the design of a receive beam form. For example, the device selection coordinator may indicate to the analog beamforming administrator 1230 that the first UE and the second UE are selected for simultaneous uplink transmission. The uplink scheduler 1225 may indicate to the analog beamforming administrator 1230 the time and frequency resources that the first UE and second UE are to use for the uplink transmission. Using this and/or other information (e.g., SNR information, priority information, traffic type information, UE positioning information, etc.) the analog beamforming administrator 1230 may design an analog beam to receive the uplink signals. In one example, the analog beamforming administrator 1230 may design the shape of the receive beam so that more gain is directed towards the UE with lower SNR. In some examples, the analog beamforming administrator 1230 may design the shape of the receive beam so that more gain is directed towards the UE that was sent the most resource blocks. In some cases, the analog beamforming administrator 1230 may design the shape of the receive beam so that the gain is directed in the directions of the first UE and the second UE. Thus, the analog beamforming administrator 1230 may receive the one or more first uplink control messages and the one or more second uplink control messages by using beamforming based at least in part on a geographic location associated with the first UE and the second UE as described with reference to FIGS. 2-6.

Figure 13:
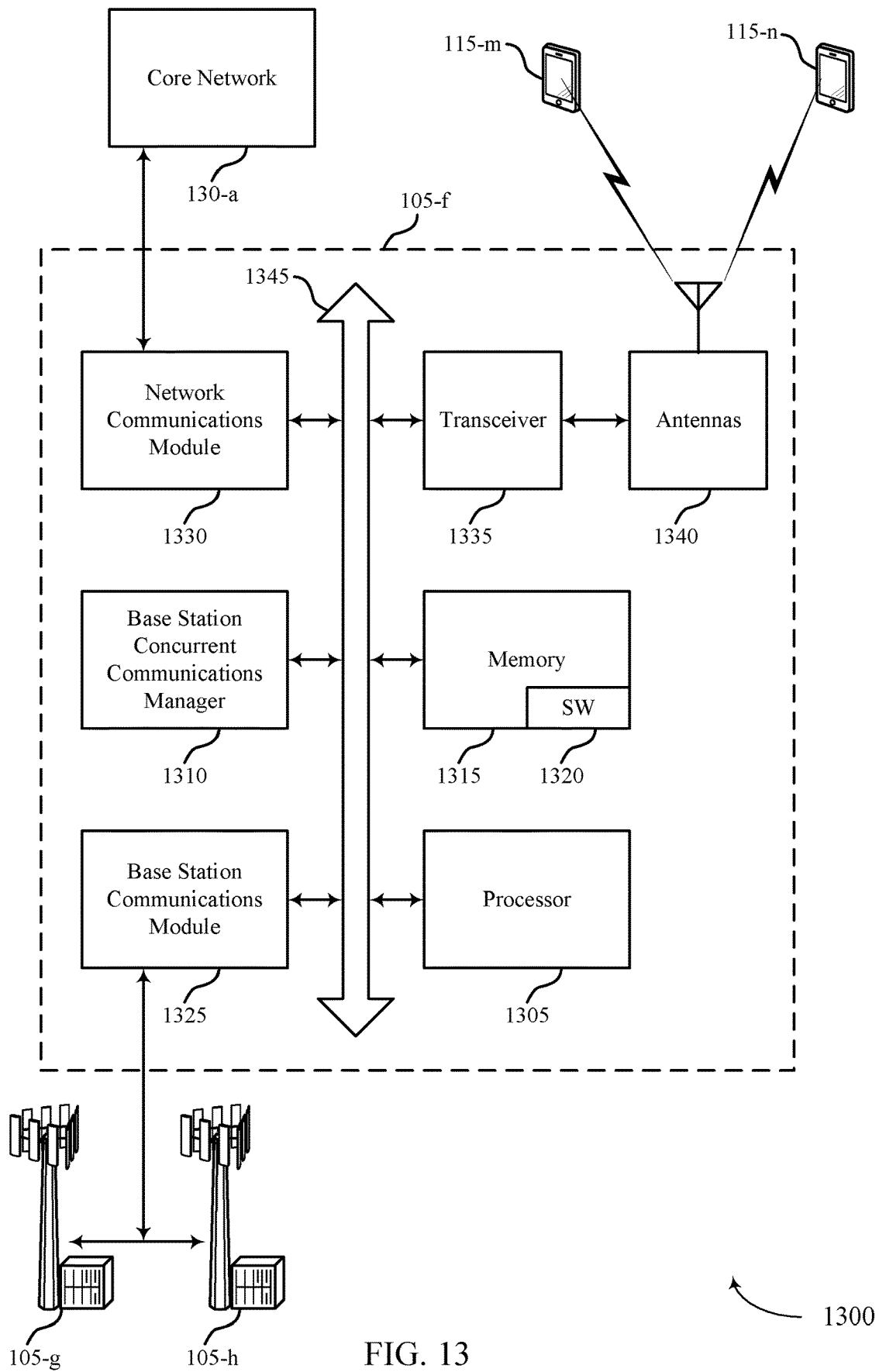
FIG. 13 shows a block diagram of a wireless device that supports reception of multiple uplink control messages at a same time slot in accordance with various aspects of the present disclosure.

FIG. 13 shows a diagram of a system 1300 including a base station 105-*f* configured for reception of multiple uplink control messages at a same time slot in accordance with various aspects of the present disclosure. Base station 105-*f* may be an example of a wireless device 1000, a wireless device 1100, or a base station 105 described with reference to FIGS. 1, 2 and 10-11. Base station 105-*f* may include a base station concurrent communications manager 1310, which may be an example of a base station concurrent communications manager 1010 described with reference to FIGS. 10-12. Base station 105-*f* may also include components for bi-directional voice and data communications including components for transmitting communications and components for receiving communications. For example, base station 105-*k* may communicate bi-directionally with UE 115-*m* or UE 115-*n*. In some cases, base station 105-*k* may receive simultaneous uplink transmissions from multiple UEs 115 (e.g., UE 115-*m* and UE 115-*n*). The simultaneous uplink transmissions may include message from multiple UEs in the same time slot using orthogonal tones. In some scenarios, the messages are in response to downlink messages from base station 105-*f*. In some cases, the messages are sent using time and frequency resources indicated by the base station 105-*f*.

In some cases, base station 105-*f* may have one or more wired backhaul links. Base station 105-*f* may have a wired backhaul link (e.g., S1 interface, etc.) to the core network 130-*a*. Base station 105-*f* may also communicate with other base stations 105, such as base station 105-*g* and base station 105-*h* via inter-base station backhaul links (e.g., an X2 interface). Each of the base stations 105 may communicate with UEs 115 using the same or different wireless communications technology. In some cases, base station 105-*f* may communicate with other base stations such as 105-*m* or 105-*n* utilizing base station communications module 1325. In some examples, base station communications module 1325 may provide an X2 interface within a Long Term Evolution (LTE)/LTE-A wireless communication network technology to provide communication between some of the base stations 105. In some examples, base station 105-*f* may communicate with other base stations through core network 130-*a*. In some cases, base station 105-*f* may communicate with the core network 130-*a* through network communications module 1330.

The base station 105-*f* may include a processor 1305, memory 1315 (including software code 1320), transceiver 1335, and antenna(s) 1340, which each may be in communication, directly or indirectly, with one another (e.g., over bus system 1345). The transceivers 1335 may be configured to communicate bi-directionally, via the antenna(s) 1340, with the UEs 115, which may be multi-mode devices. The transceiver 1335 (or other components of the base station 105-*f*) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-*f* may include multiple transceivers 1335, each with one or more associated antennas 1340. The transceiver may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor 1305 to perform various functions described herein (e.g., reception of multiple uplink control messages at a same time slot, selecting coverage enhancement techniques, call processing, database management, message routing, etc.). Alternatively, the software code 1320 may not be directly executable by the processor 1305 but be configured to cause the computer (e.g., when compiled and executed) to perform functions described herein. The processor 1305 may include an intelligent hardware device (e.g., a CPU, a microcontroller, an ASIC, etc.). The processor 1305 may include various special-purpose processors such as encoders, queue processing modules, base band processors, radio head controllers, digital signal processors (DSPs), and the like.

The base station communications module 1325 may manage communications with other base stations 105. In some cases, a communications management module may include a controller or scheduler for controlling communications with UEs 115 in cooperation with other base stations 105. For example, the base station communications module 1325 may coordinate scheduling for transmissions to UEs 115 for various interference mitigation techniques such as beamforming or joint transmission.

Figure 14:
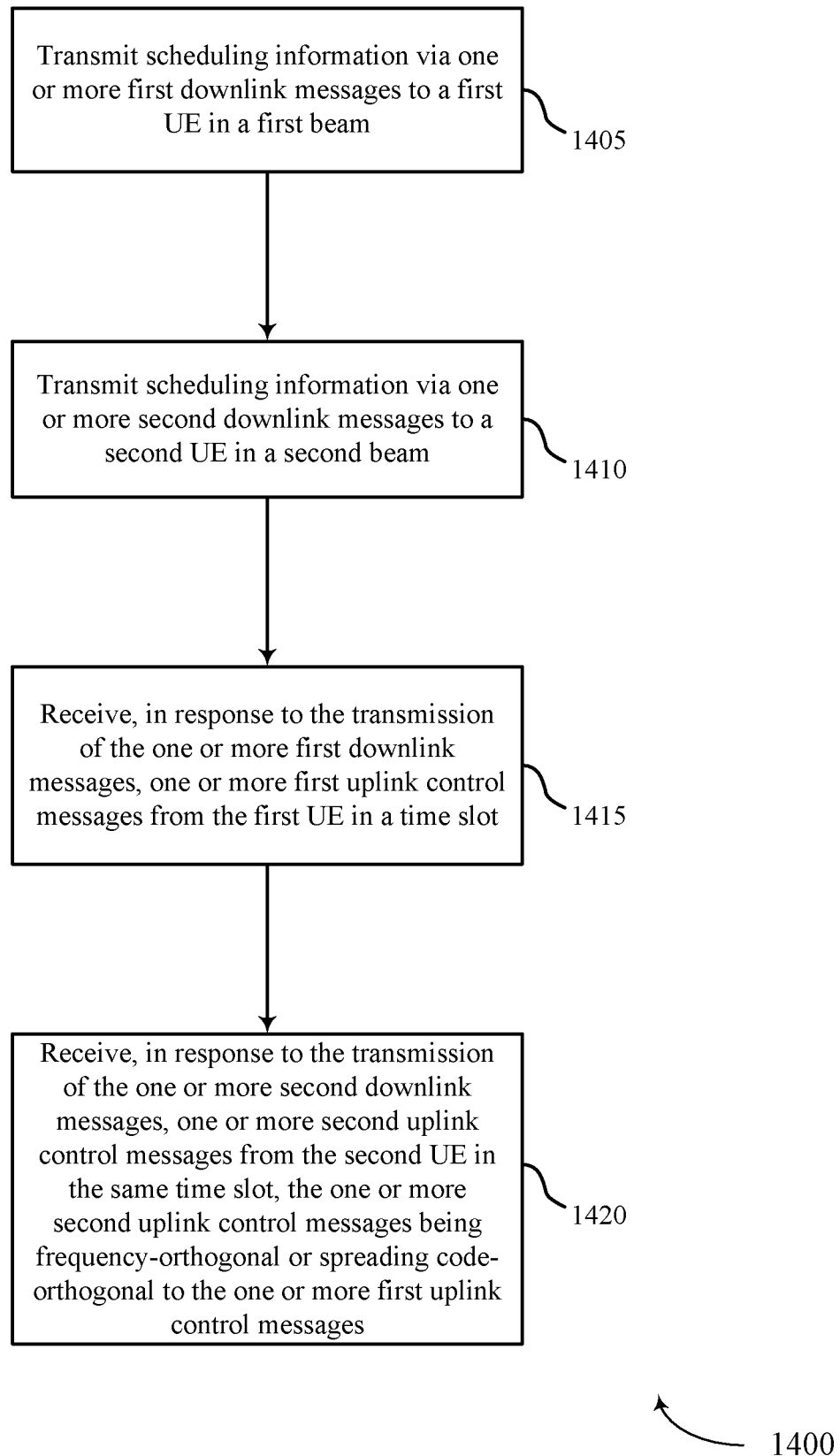
FIG. 14 illustrates a method for reception of multiple uplink control messages at a same time slot in accordance with various aspects of the present disclosure.

FIG. 14 shows a flowchart illustrating a method 1400 for reception of multiple uplink control messages at a same time slot in accordance with various aspects of the present disclosure. The operations of method 1400 may be implemented by a base station 105 or its components as described with reference to FIGS. 1-13. For example, the operations of method 1400 may be performed by the base station concurrent communications manager 1010 as described with reference to FIGS. 10-12. In some examples, a base station 105 may execute a set of codes to control the functional elements of the base station 105 to perform the functions described below. Additionally or alternatively, the base station 105 may perform aspects the functions described below using special-purpose hardware.

At block 1405, the base station 105 may transmit scheduling information via one or more first downlink messages to a first UE in a first beam as described with reference to FIGS. 2-6. In certain examples, the operations of block 1405 may be performed or facilitated by the downlink traffic manager 1105 as described with reference to FIG. 11. At block 1410, the base station 105 may transmit scheduling information via one or more second downlink messages to a second UE in a second beam as described with reference to FIGS. 2-6. In certain examples, the operations of block 1410 may be performed or facilitated by the downlink traffic manager 1105 as described with reference to FIG. 11. In some cases, the one or more first downlink messages and the one or more second downlink messages are transmitted simultaneously.

At block 1415, the base station 105 may receive, in response to the transmission of the one or more first downlink messages, one or more first uplink control messages from the first UE in a time slot as described with reference to FIGS. 2-6. In certain examples, the operations of block 1415 may be performed or facilitated by the uplink control traffic manager 1110 as described with reference to FIG. 11. At block 1420, the base station 105 may receive, in response to the transmission of the one or more second downlink messages, one or more second uplink control messages from the second UE in the time slot as described with reference to FIGS. 2-6. In some cases, the one or more second uplink control messages are frequency-orthogonal or spreading code-orthogonal to the one or more first uplink control messages. In certain examples, the operations of block 1420 may be performed or facilitated by the uplink control traffic manager 1110 as described with reference to FIG. 11.

Figure 15:
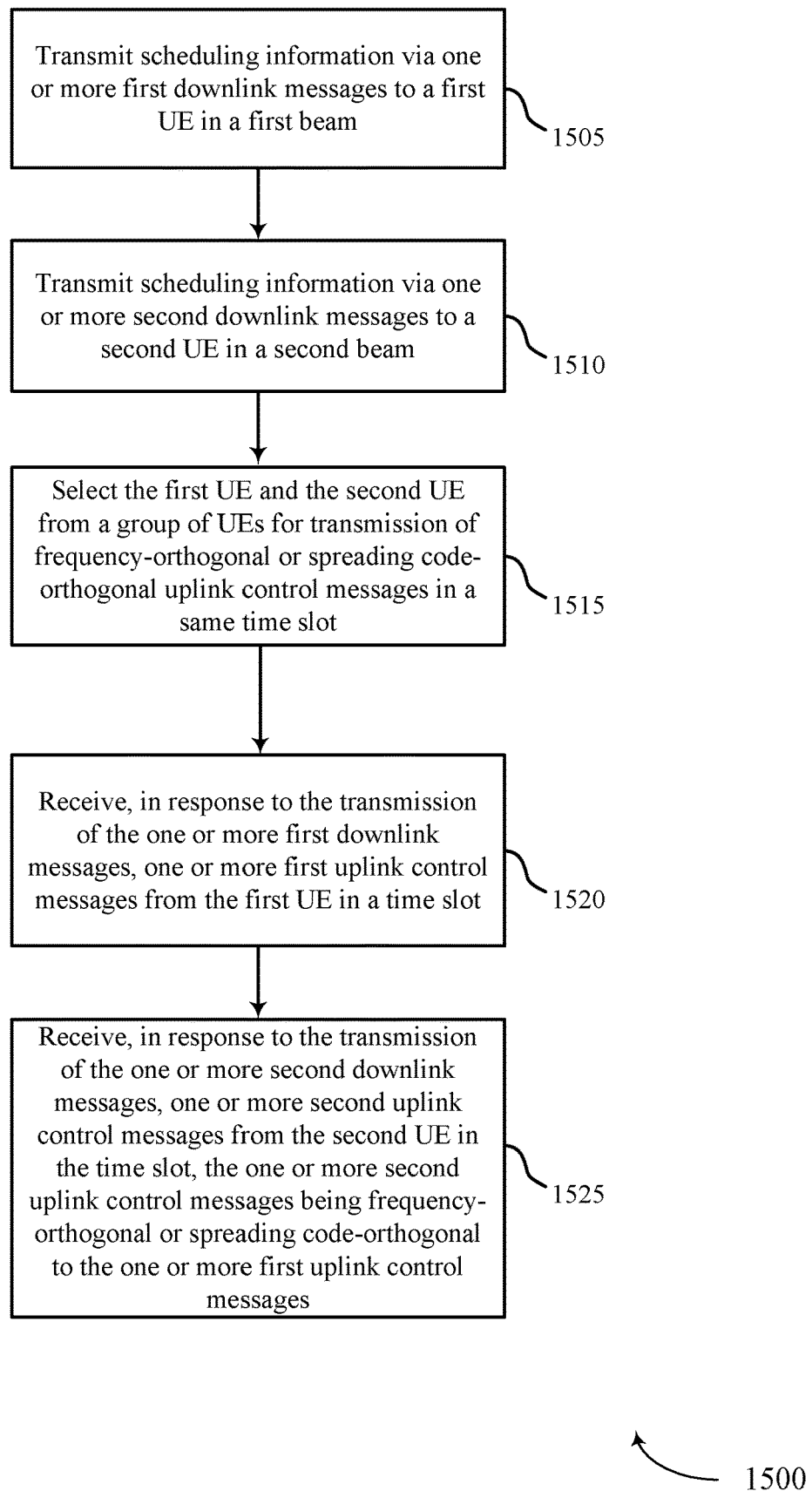
FIG. 15 illustrates a method for reception of multiple uplink control messages at a same time slot in accordance with various aspects of the present disclosure.

FIG. 15 shows a flowchart illustrating a method 1500 for reception of multiple uplink control messages at a same time slot in accordance with various aspects of the present disclosure. The operations of method 1500 may be implemented by a base station 105 or its components as described with reference to FIGS. 1-13. For example, the operations of method 1500 may be performed by the base station concurrent communications manager 1010 as described with reference to FIGS. 10-12. In some examples, a base station 105 may execute a set of codes to control the functional elements of the base station 105 to perform the functions described below. Additionally or alternatively, the base station 105 may perform aspects the functions described below using special-purpose hardware. The method 1500 may also incorporate aspects of method 1400 of FIG. 14.

At block 1505, the base station 105 may transmit scheduling information via one or more first downlink messages to a first UE in a first beam as described with reference to FIGS. 2-6. In certain examples, the operations of block 1505 may be performed or facilitated by the downlink traffic manager 1105 as described with reference to FIG. 11. At block 1510, the base station 105 may transmit scheduling information via one or more second downlink messages to a second UE in a second beam as described with reference to FIGS. 2-6. In certain examples, the operations of block 1510 may be performed or facilitated by the downlink traffic manager 1105 as described with reference to FIG. 11.

At block 1515, the base station 105 may select the first UE and the second UE from a group of UEs for transmission of frequency-orthogonal or spreading code-orthogonal uplink control messages in a same time slot as described with reference to FIGS. 2-6. In certain examples, the operations of block 1515 may be performed by the device selection coordinator 1205 as described with reference to FIG. 12. In some cases, selecting the first UE and the second UE is based at least in part on respective angles of arrival of signals received from the first UE and the second UE. In some examples, selecting the first UE and the second UE is based at least in part on respective SNRs associated with channels used by the first UE and the second UE to communicate uplink control traffic. In some scenarios, selecting the first UE and the second UE is based at least in part on a number of downlink resource blocks transmitted to the first UE and the second UE, respectively.

At block 1520, the base station 105 may receive, in response to the transmission of the one or more first downlink messages, one or more first uplink control messages from the first UE in a time slot as described with reference to FIGS. 2-6. In certain examples, the operations of block 1520 may be performed or facilitated by the uplink control traffic manager 1110 as described with reference to FIG. 11. At block 1525, the base station 105 may receive, in response to the transmission of the one or more second downlink messages, one or more second uplink control messages from the second UE in the time slot as described with reference to FIGS. 2-6. In some cases, the one or more second uplink control messages are frequency-orthogonal or spreading code-orthogonal to the one or more first uplink control messages. In certain examples, the operations of block 1525 may be performed or facilitated by the uplink control traffic manager 1110 as described with reference to FIG. 11.

Figure 16:
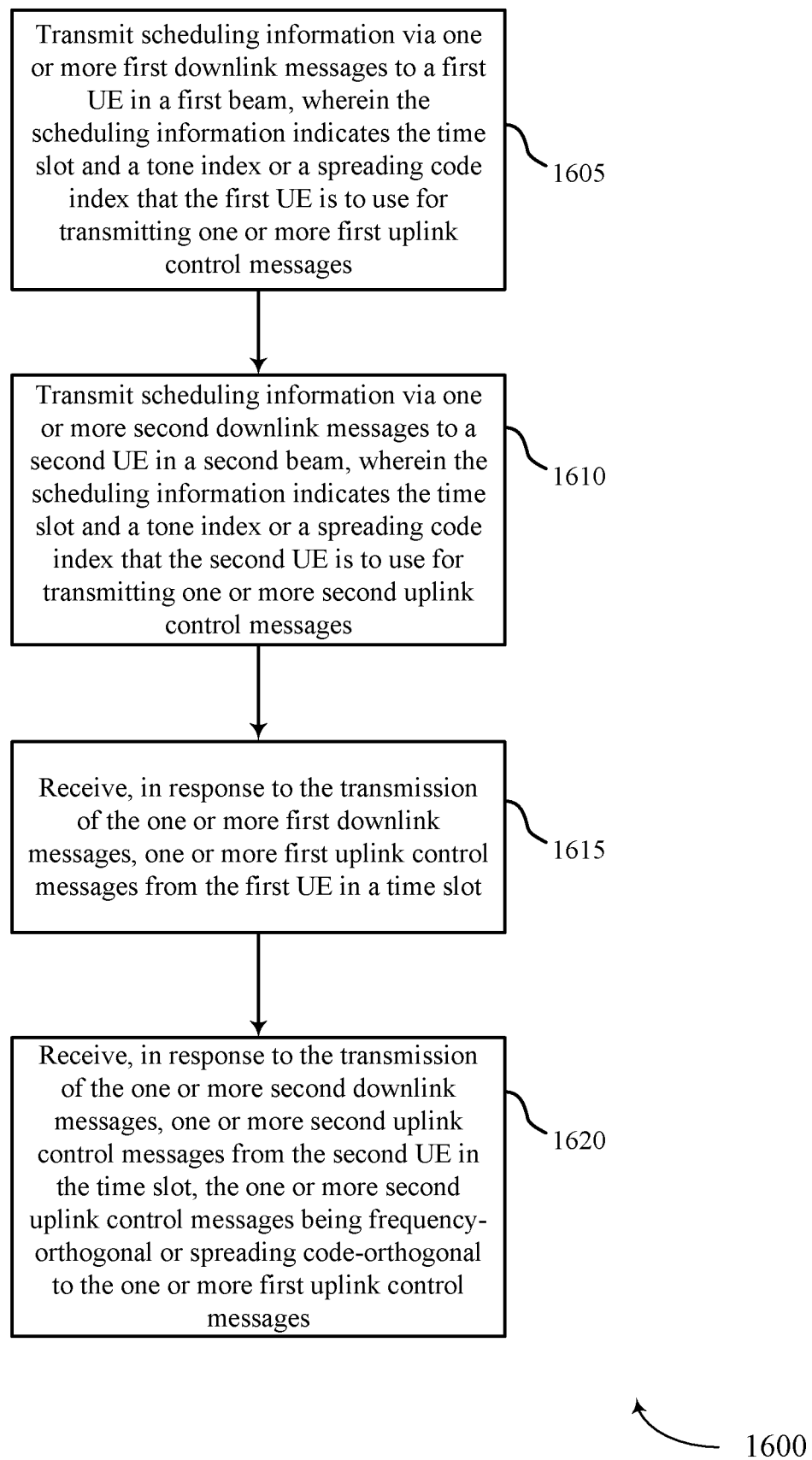
FIG. 16 illustrates a method for reception of multiple uplink control messages at a same time slot in accordance with various aspects of the present disclosure.

FIG. 16 shows a flowchart illustrating a method 1600 for reception of multiple uplink control messages at a same time slot in accordance with various aspects of the present disclosure. The operations of method 1600 may be implemented by a base station 105 or its components as described with reference to FIGS. 1-13. For example, the operations of method 1600 may be performed by the base station concurrent communications manager 1010 as described with reference to FIGS. 10-12. In some examples, a base station may execute a set of codes to control the functional elements of the base station 105 to perform the functions described below. Additionally or alternatively, the base station may perform aspects the functions described below using special-purpose hardware. The method 1600 may also incorporate aspects of methods 1400 and 1500 of FIGS. 14-15.

At block 1605, the base station 105 may transmit scheduling information via one or more first downlink messages to a first UE in a first beam as described with reference to FIGS. 2-6. The scheduling information may indicate the time slot and a tone index that the first UE is to use for transmitting one or more first uplink control messages. In certain examples, the operations of block 1605 may be performed or facilitated by the downlink traffic manager 1105 as described with reference to FIG. 11, as well as by the uplink scheduler 1225 as described with reference to FIG. 12. At block 1610, the base station 105 may transmit scheduling information via one or more second downlink messages to a second UE in a second beam as described with reference to FIGS. 2-6. The scheduling information may indicate the time slot and a tone index that the second UE is to use for transmitting one or more second uplink control messages. In certain examples, the operations of block 1610 may be performed or facilitated by the downlink traffic manager 1105 as described with reference to FIG. 11, as well as by the uplink scheduler 1225 as described with reference to FIG. 12.

At block 1615, the base station 105 may receive, in response to the transmission of the one or more first downlink messages, one or more first uplink control messages from the first UE in a time slot as described with reference to FIGS. 2-6. In certain examples, the operations of block 1615 may be performed or facilitated by the uplink control traffic manager 1110 as described with reference to FIG. 11. At block 1620, the base station 105 may receive, in response to the transmission of the one or more second downlink messages, one or more second uplink control messages from the second UE in the time slot as described with reference to FIGS. 2-6. In some cases, the one or more second uplink control messages are frequency-orthogonal or spreading code-orthogonal to the one or more first uplink control messages. In certain examples, the operations of block 1620 may be performed or facilitated by the uplink control traffic manager 1110 as described with reference to FIG. 11.

Figure 17:
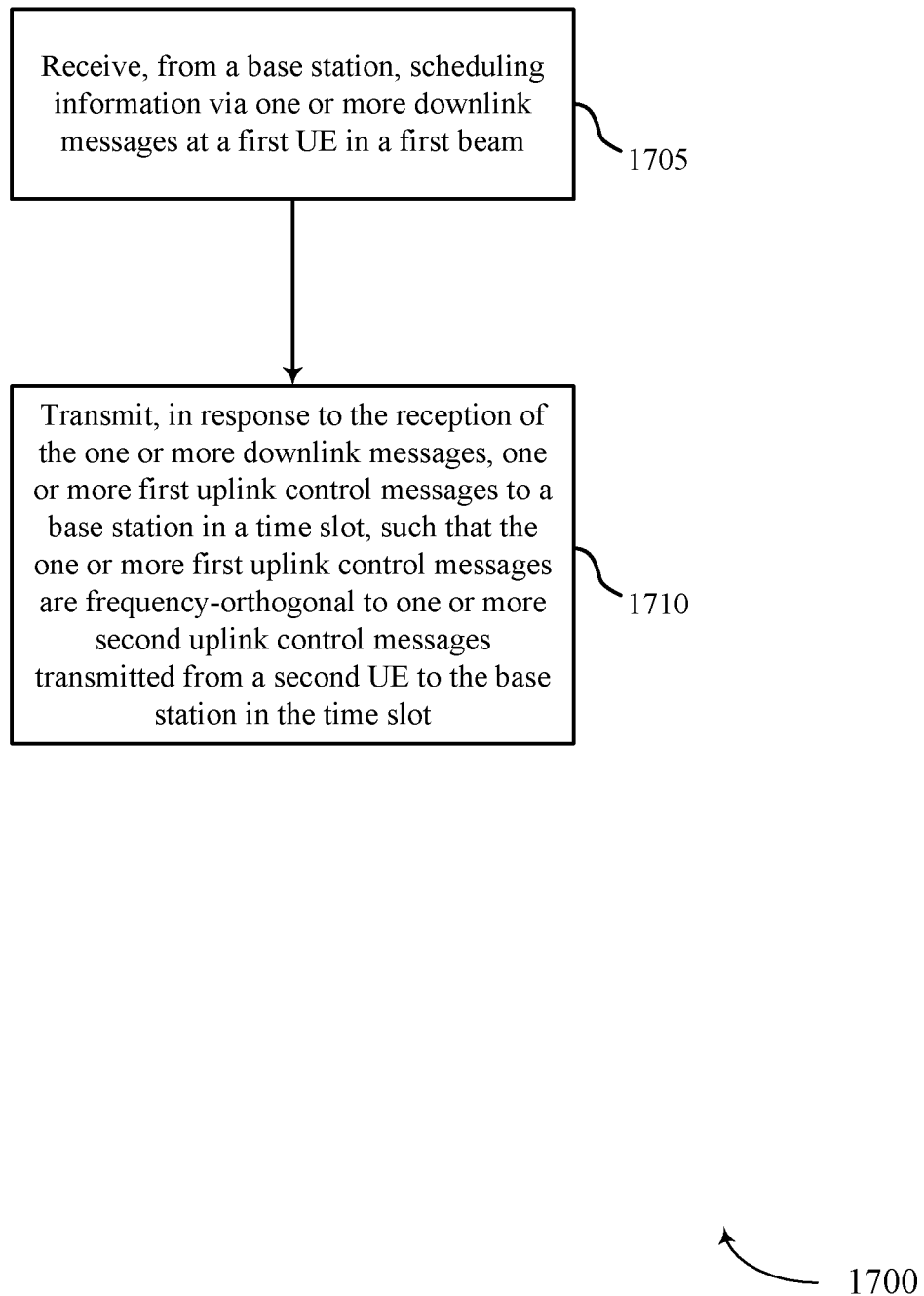
FIG. 17 illustrates a method for transmission of uplink control messages at a same time slot as that used by other wireless devices in accordance with various aspects of the present disclosure.

FIG. 17 shows a flowchart illustrating a method 1700 for transmission of uplink control messages at a same time slot as that used by other wireless devices communicating with a same base station, in accordance with various aspects of the present disclosure. The operations of method 1700 may be implemented by a UE 115 or its components as described with reference to FIGS. 1-13. For example, the operations of method 1700 may be performed by the concurrent communications manager 710 as described with reference to FIGS. 7-9. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of methods 1400, 1500, and 1600 of FIGS. 14-16.

At block 1705, the UE 115 may receive, from a base station, scheduling information via one or more downlink messages at a first UE in a first beam as described with reference to FIGS. 2-6. In certain examples, the operations of block 1705 may be performed by the downlink monitor 805 as described with reference to FIG. 8. At block 1710, the UE 115 may transmit, in response to the reception of the one or more downlink messages, one or more first uplink control messages to a base station in a time slot, wherein the one or more first uplink control messages are frequency-orthogonal to one or more second uplink control messages transmitted from a second UE to the base station in the time slot as described with reference to FIGS. 2-6. In certain examples, the operations of block 1710 may be performed by the uplink coordinator 810 as described with reference to FIG. 8. In some cases, the UE 115 may receive scheduling information indicating that the first UE is to transmit the one or more first uplink control messages in the time slot and using a tone index. The scheduling information may include an indicator that the second UE is to transmit the one or more second uplink control messages in the time slot.

In some scenarios, the one or more downlink messages include data and the one or more first uplink control messages and the one or more second uplink control messages includes an ACK/NACK associated with the one or more downlink messages received by the first UE or with one or more second downlink messages received by the second UE. In some examples, the one or more downlink messages include control information, and the one or more first uplink control messages and the one or more second uplink control messages include a CQI, or an ACK/NACK associated with the one or more downlink messages received by the first UE or with one or more second downlink messages received by the second UE. In some cases, the UE 115 uses millimeter waveforms to transmit the one or more first uplink control messages. In some cases, the UE 115 transmits the one or more first uplink control messages by using analog beamforming.

Thus, methods 1400, 1500, 1600, and 1700 may provide for reception of multiple uplink control messages at a same time slot. It should be noted that methods 1400, 1500, 1600, and 1700 describe possible implementation, and that the operations and the steps may be rearranged or otherwise modified such that other implementations are possible. In some examples, aspects from two or more of the methods 1400, 1500, 1600, and 1400 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of UMTS that use E-UTRA. UTRA, E-UTRA, UMTS, LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of eNBs provide coverage for various geographical regions. For example, each eNB or base station may provide communication coverage for a macro cell, a small cell, or other types of cells. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications subsystem 200 of FIGS. 1 and 2—may include one or more carriers, where each carrier may be a signal made up of multiple subcarriers (e.g., waveform signals of different frequencies). Each modulated signal may be sent on a different subcarrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication performed at a base station, comprising:
    transmitting scheduling information for one or more first uplink control messages via one or more first downlink messages to a first user equipment (UE) in a first beam, wherein the scheduling information for the one or more first uplink control messages indicates a time slot and a first spreading code index that the first UE is to use for transmitting the one or more first uplink control messages;
    transmitting scheduling information for one or more second uplink control messages via one or more second downlink messages to a second UE in a second beam, wherein the scheduling information for the one or more second uplink control messages indicates the time slot and a second spreading code index that the second UE is to use for transmitting the one or more second uplink control messages;
    generating a receive beam;
    receiving, in response to the transmission of the one or more first downlink messages, the one or more first uplink control messages from the first UE in the time slot based at least in part on the generated receive beam; and
    receiving, in response to the transmission of the one or more second downlink messages, the one or more second uplink control messages from the second UE in the time slot based at least in part on the generated receive beam, the one or more second uplink control messages being spreading code-orthogonal to the one or more first uplink control messages based on the first spreading code index being different than the second spreading code index.

2. The method of claim 1, further comprising:
    selecting the first UE and the second UE from a group of UEs for transmission of spreading code-orthogonal uplink control messages in the time slot.

3. The method of claim 2, wherein selecting the first UE and the second UE comprises:
selecting the first UE and the second UE based at least in part on respective angles of arrival of signals received from the first UE and the second UE.

4. The method of claim 2, wherein selecting the first UE and the second UE comprises:
selecting the first UE and the second UE based at least in part on respective signal-to-noise ratios (SNRs) associated with channels used by the first UE and the second UE to communicate uplink control traffic.

5. The method of claim 2, wherein selecting the first UE and the second UE comprises:
selecting the first UE and the second UE based at least in part on a number of downlink resource blocks transmitted to the first UE and the second UE, respectively.

6. The method of claim 1, further comprising:
transmitting the one or more first downlink messages and the one or more second downlink messages at a same time.

7. The method of claim 1, wherein the one or more first downlink messages and the one or more second downlink messages comprise data, and wherein the one or more first uplink control messages and the one or more second uplink control messages comprise an acknowledgment or negative acknowledgment associated with the one or more first downlink messages or the one or more second downlink messages.

8. The method of claim 1, wherein the one or more first downlink messages and the one or more second downlink messages comprise control information, and wherein the one or more first uplink control messages and the one or more second uplink control messages comprise an acknowledgment, a negative acknowledgment, or a channel quality indicator (CQI) associated with the one or more first downlink messages or the one or more second downlink messages.

9. The method of claim 1, further comprising:
receiving the one or more first uplink control messages and the one or more second uplink control messages by using beamforming based at least in part on a geographic location associated with the first UE and the second UE.

10. The method of claim 1, further comprising:
receiving the one or more first uplink control messages and the one or more second uplink control messages by using analog beamforming.

11. The method of claim 1, further comprising:
using one or more millimeter waveforms to receive the one or more first uplink control messages and the one or more second uplink control messages.

12. The method of claim 1, further comprising:
using one or more millimeter waveforms to transmit the one or more first downlink messages and the one or more second downlink messages.

13. A method of wireless communication performed at a first user equipment (UE), comprising:
receiving, from a base station, scheduling information for one or more first uplink control messages via one or more downlink messages in a first beam, wherein the scheduling information for the one or more first uplink control messages indicates a time slot and a first spreading code index that the first UE is to use for transmitting the one or more first uplink control messages; and
transmitting, in response to the reception of the one or more downlink messages, the one or more first uplink control messages to the base station in the time slot, wherein the first spreading code index is configured such that the one or more first uplink control messages are spreading code-orthogonal to one or more second uplink control messages transmitted from a second UE to the base station in the time slot using a second spreading code index based on the first spreading code index being different than the second spreading code index.

14. The method of claim 13, wherein the first UE and the second UE are selected from a group of UEs for transmission of spreading code-orthogonal messages in the time slot.

15. The method of claim 14, wherein the first UE and the second UE are selected based at least in part on respective angles of arrival of signals received from the first UE and the second UE.

16. The method of claim 14, wherein the first UE and the second UE are selected based at least in part on respective signal-to-noise ratios (SNRs) associated with channels used by the first UE and the second UE to communicate uplink control traffic.

17. The method of claim 14, wherein the first UE and the second UE are selected based at least in part on a number of downlink resource blocks transmitted to the first UE and the second UE, respectively.

18. The method of claim 13, wherein the scheduling information comprises an indicator that the second UE is to transmit the one or more second uplink control messages in the time slot.

19. The method of claim 13, wherein the one or more downlink messages comprise data, and wherein the one or more first uplink control messages and the one or more second uplink control messages comprise an acknowledgment or negative acknowledgment associated with the one or more downlink messages received by the first UE or with one or more second downlink messages received by the second UE.

20. The method of claim 13, wherein the one or more downlink messages comprise control information, and wherein the one or more first uplink control messages and the one or more second uplink control messages comprise an acknowledgment, a negative acknowledgment, or a channel quality indicator (CQI) associated with the one or more downlink messages received by the first UE or with one or more second downlink messages received by the second UE.

21. The method of claim 13, further comprising:
using millimeter waveforms to transmit the one or more uplink control messages.

22. The method of claim 13, further comprising:
transmitting the one or more first uplink control messages by using analog beamforming.

23. A base station, comprising:
a processor;
memory in electronic communication with the processor; and
instructions stored in the memory and operable, when executed by the processor, to:
transmit scheduling information for one or more first uplink control messages via one or more first downlink messages to a first user equipment (UE) in a first beam, wherein the scheduling information for the one or more first uplink control messages indicates a time slot and a first spreading code index that the first UE is to use for transmitting the one or more first uplink control messages;
transmit scheduling information for one or more second uplink control messages via one or more second downlink messages to a second UE in a second beam, wherein the scheduling information for the one or more second uplink control messages indicates the time slot and a second spreading code index that the second UE is to use for transmitting the one or more second uplink control messages;

generate a receive beam;

receive, in response to the transmission of the one or more first downlink messages, the one or more first uplink control messages from the first UE in the time slot based at least in part on the generated receive beam; and receive, in response to the transmission of the one or more second downlink messages, the one or more second uplink control messages from the second UE in the time slot based at least in part on the generated receive beam, the one or more second uplink control messages being spreading code-orthogonal to the one or more first uplink control messages based on the first spreading code index being different than the second spreading code index.

24. The base station of claim 23, wherein the instructions are operable to:

select the first UE and the second UE from a group of UEs for transmission of spreading code-orthogonal messages in the time slot.

25. The base station of claim 23, wherein the one or more first downlink messages and the one or more second downlink messages comprise data, and wherein the one or more first uplink control messages and the one or more second uplink control messages comprise an acknowledgment or negative acknowledgment associated with the one or more first downlink messages or the one or more second downlink messages.

26. A user equipment (UE), comprising:

a processor;

memory in electronic communication with the processor; and instructions stored in the memory and operable, when executed by the processor, to:

receive, from a base station, scheduling information for one or more first uplink control messages via one or more downlink messages in a first beam, wherein the scheduling information for the one or more first uplink control messages indicates a time slot and a first spreading code index that the first UE is to use for transmitting the one or more first uplink control messages; and transmit, in response to the reception of the one or more downlink messages, the one or more first uplink control messages to the base station in the time slot, wherein the first spreading code index is configured such that the one or more first uplink control messages are spreading code-orthogonal to one or more second uplink control messages transmitted from a second UE to the base station in the time slot using a second spreading code index based on the first spreading code index being different than the second spreading code index.

27. The UE of claim 26, wherein the first UE and the second UE are selected from a group of UEs for transmission of spreading code-orthogonal messages in the time slot.

28. The UE of claim 26, wherein the scheduling information comprises an indicator that the second UE is to transmit the one or more second uplink control messages in the time slot.

* * * * *